US010282062B2

(12) United States Patent
Liu et al.

(10) Patent No.: US 10,282,062 B2
(45) Date of Patent: May 7, 2019

(54) TECHNIQUES FOR REPAIRABLE SYSTEM SIMULATIONS

(71) Applicant: SAS Institute Inc., Cary, NC (US)

(72) Inventors: Peng Liu, Naperville, IL (US); Leo Thomas Wright, Jr., Wolverine, MI (US)

(73) Assignee: SAS INSTITUTE INC., Cary, NC (US)

(*) Notice: Subject to any disclaimer, the term of this patent is extended or adjusted under 35 U.S.C. 154(b) by 0 days.

(21) Appl. No.: 15/723,539

(22) Filed: Oct. 3, 2017

(65) Prior Publication Data

US 2018/0095619 A1    Apr. 5, 2018

Related U.S. Application Data

(60) Provisional application No. 62/403,362, filed on Oct. 3, 2016.

(51) Int. Cl.
*G06F 3/0482* (2013.01)
*G06F 3/0481* (2013.01)
(Continued)

(52) U.S. Cl.
CPC .......... *G06F 3/0482* (2013.01); *G06F 3/0486* (2013.01); *G06F 3/04817* (2013.01);
(Continued)

(58) Field of Classification Search
CPC ............... Y10S 715/967; G06F 3/0486; G06F 17/5009; G06F 3/04817; H04L 67/025;
(Continued)

(56) References Cited

U.S. PATENT DOCUMENTS 6,522,346 B1 * 2/2003 Meyer ................ G05B 19/0426
700/17
6,650,731 B1   11/2003 Steltner et al.
(Continued)

FOREIGN PATENT DOCUMENTS

EP      411873 A2     2/1991
EP      1160712       12/2001

OTHER PUBLICATIONS

YouTube video, Askozia Tutorial: How to Create an IVR Menu with the Call Flow Editor, published on Nov. 28, 2012, downloaded from https://www.youtube.com/watch?v=ViJJ_hcpbyw.*
(Continued)

*Primary Examiner* — Jennifer N To
*Assistant Examiner* — Eric J Yoon

(57) ABSTRACT

Various embodiments are generally directed to systems for designing, generating, and/or creating maintenance arrangements for repairable systems in an interactive workspace, such as for computer simulation of maintenance events. Some embodiments are particularly directed to an interactive workspace that enables assignments and intuitive modeling of a maintenance arrangement associated with one or more components in a reliability block diagram (RBD). In embodiments, a system maintenance arrangement for one or more components of the RBD may be generated in a diagram workspace by associating events selected from an event menu with one or more components in an RBD; and by associating actions selected from an action menu with one or more events via the addition of linking elements. In such embodiments, resolution of an occurrence of an event, such as during a computer simulation, may depend on performance or simulated performance of the actions associated with the event via linking elements.

39 Claims, 26 Drawing Sheets

(51) Int. Cl.
*G06F 17/50* (2006.01)
*G06F 3/0484* (2013.01)
*G06F 3/0486* (2013.01)

(52) U.S. Cl.
CPC ...... *G06F 3/04847* (2013.01); *G06F 17/5009* (2013.01); *G06F 17/509* (2013.01)

(58) Field of Classification Search
CPC ......... G06B 2219/23258; G06Q 10/06; G06Q 10/0633; G06Q 10/067; Y02P 90/86; H04M 1/82552
See application file for complete search history.

(56) References Cited

U.S. PATENT DOCUMENTS

| | | | |
|---|---|---|---|
| 7,197,447 | B2 | 3/2007 | Susskind |
| 7,221,987 | B2 | 5/2007 | Bett et al. |
| 2001/0025235 | A1 | 9/2001 | Otsuka |
| 2003/0034998 | A1* | 2/2003 | Kodosky ............ G05B 19/0426 715/736 |
| 2004/0123179 | A1 | 6/2004 | Dragomir-Daescu et al. |
| 2007/0016840 | A1 | 1/2007 | Zurawka et al. |
| 2008/0313507 | A1 | 12/2008 | Mahmud et al. |
| 2011/0061041 | A1 | 3/2011 | Hellebro et al. |
| 2013/0331963 | A1 | 12/2013 | Ahangar et al. |

OTHER PUBLICATIONS

Quick Start Guide, BlockSimVersion 10, published at least by 2016 (Year: 2016).*
"Using Markov Diagrams in BlockSim for Reliability Analysis," published Nov. 2015, downloaded from https://www.weibull.com/hotwire/issue177/hottopics177.htm (Year: 2015).*
T. Bunzel, "Microsoft Office Reference Guide," published Mar. 26, 2004, downloaded from http://www.informit.com/articles/article.aspx?p=170392&seqNum=158 (Year: 2004).*
S. Basu, How to Create Stunning Flowcharts with Microsoft Word, published Sep. 18, 2014, downloaded from https://www.makeuseof.com/tag/create-stunning-flowcharts-microsoft-word/ (Year: 2014).*
"Availability Simulation—Isograph", Isograph, retrieved at <https://www.isograph.com/software/availability-workbench/availability-simulation/>, retrieved Dec. 9, 2016, 3 pages (author unknown).
"Blocksim", retrieved at <http://Blocksim.Reliasoft.com>, Reliasoft.com, retrieved Dec. 9, 2016,, 2 pages (author unknown).
Hynek, Jeremy, "Optimizing a Reliability Block Diagram from a schematic Webinar", Isograph blog, Aug. 31, 2016, 1 page.
Modarres et al., "Reliability Engineering and Risk Analysis—System Reliability Analysis", Chapter 4, 1963, 12 pages.
"SAS Simulation Studio", SAS Institute, Inc., retrieved at <https://support.sas.com/rnd/app/or/SimulationStudio15.html> Retrieved Dec. 9, 2016, 2 pages (author unknown).
Meeker et al., "System Reliability Concepts and Methods", retrieved at <https://www.amazon.com/Statistical-Methods-Reliability-William-Meeker/dp/0471143286> Chapter 15, 1998, 24 pages.

* cited by examiner

System device menu 1210

System device icon set 1622

| System device icon 1624-1 | System device icon 1624-2 | ••• | System device icon 1624-n |

1600D

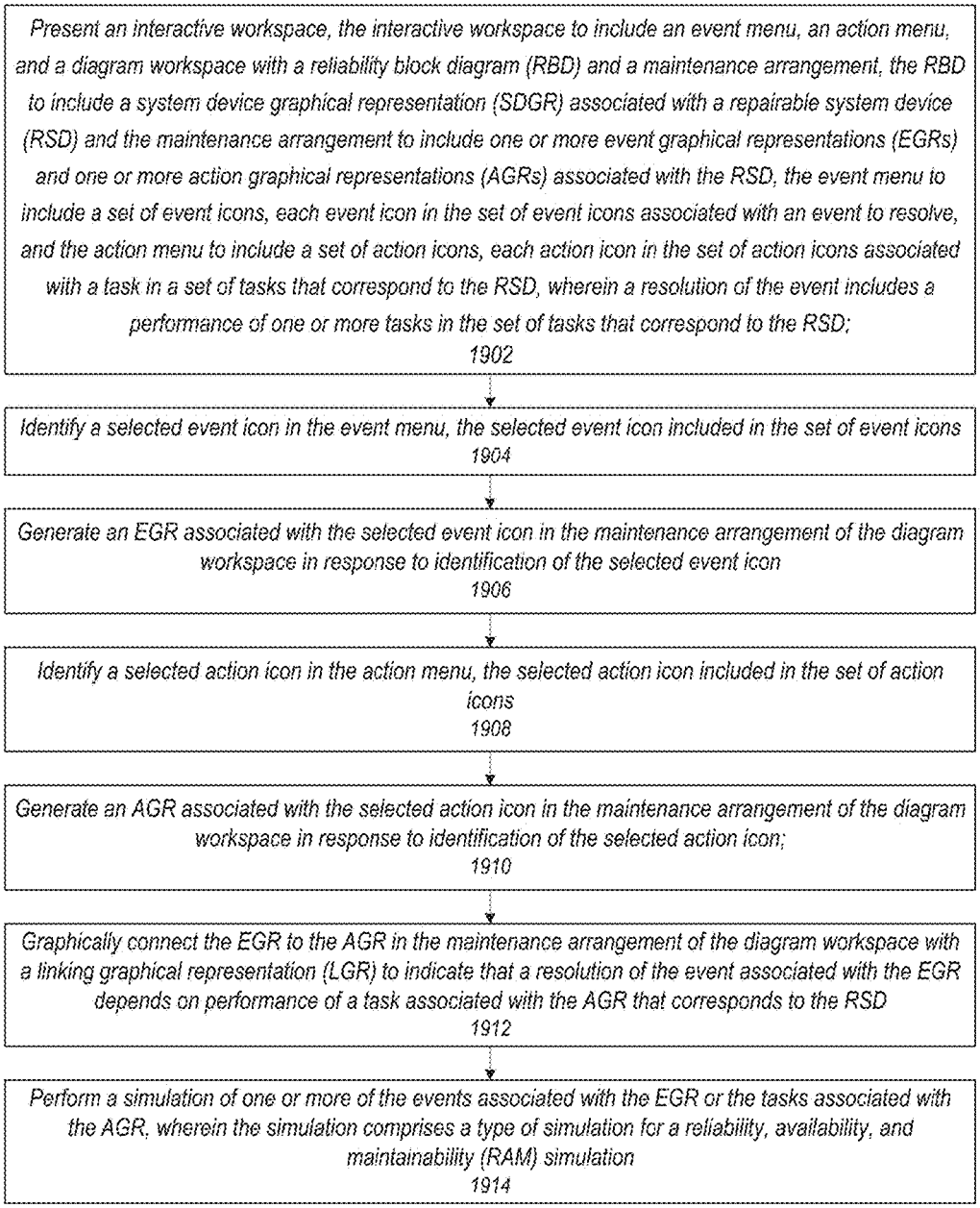

TECHNIQUES FOR REPAIRABLE SYSTEM SIMULATIONS

CROSS-REFERENCE TO RELATED APPLICATIONS

This application claims the benefit of priority under 35 U.S.C. § 119(e) to U.S. Provisional Application Ser. No. 62/403,362 filed Oct. 3, 2016, the entirety of which is incorporated herein by reference.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

Various embodiments described herein may include an apparatus comprising a processor and a storage to store instructions that, when executed by the processor, cause the processor to perform operations comprising one or more of: present an interactive workspace, the interactive workspace to include an event menu, an action menu, and a diagram workspace with a reliability block diagram (RBD) and a maintenance arrangement, the RBD to include a system device graphical representation (SDGR) associated with a repairable system device (RSD) and the maintenance arrangement to include one or more event graphical representations (EGRs) and one or more action graphical representations (AGRs) associated with the RSD, the event menu to include a set of event icons, each event icon in the set of event icons associated with an event to resolve, and the action menu to include a set of action icons, each action icon in the set of action icons associated with a task in a set of tasks that correspond to the RSD, wherein a resolution of the event includes a performance of one or more tasks in the set of tasks that correspond to the RSD; identify a selected event icon in the event menu, the selected event icon included in the set of event icons; generate an EGR associated with the selected event icon in the maintenance arrangement of the diagram workspace in response to identification of the selected event icon; identify a selected action icon in the action menu, the selected action icon included in the set of action icons; generate an AGR associated with the selected action icon in the maintenance arrangement of the diagram workspace in response to identification of the selected action icon; graphically connect the EGR to the AGR in the maintenance arrangement of the diagram workspace with a linking graphical representation (LGR) to indicate that a resolution of the event associated with the EGR depends on performance of a task associated with the AGR that corresponds to the RSD; and perform a simulation of one or more of the events associated with the EGR or the tasks associated with the AGR, wherein the simulation comprises a type of simulation for a reliability, availability, and maintainability (RAM) simulation.

In some embodiments, the event associated with the EGR may comprise a failure of the RSD or scheduled actions associated with the RSD based on a calendar or a usage of the RSD and, the task associated with the AGR comprising one or more of: a replacement of the RSD with a new device, a repair of the RSD, an inspection of the RSD, an adjustment of the RSD, or an evaluation of the RSD.

In one or more embodiments, the processor of the apparatus may be caused to perform operations comprising determining one or more of a spare part supply, a workforce availability, or a supply chain state that corresponds to performance of the task associated with the AGR.

In various embodiments, the diagram workspace may comprise a second AGR connected to the EGR with a second LGR in parallel with the LGR, wherein connection of the EGR to the second AGR with the second LGR in parallel with connection of the EGR to the AGR with the LGR indicates the AGR and the second AGR are simulated in parallel.

In some embodiments, the diagram workspace may comprise a window with a first panel for the diagram workspace, a second panel for the event menu, and a third panel for the action menu.

In one or more embodiments, the processor of the apparatus may be caused to perform operations comprising one or more of: present a graphical control element within the diagram workspace; and graphically connect the EGR to the AGR with the LGR in the diagram workspace based on a manipulation of the graphical control element.

In various embodiments, the EGR may comprise a non-maintenance event associated with testing or changing usage load of the RSD.

In some embodiments, the processor of the apparatus may be caused to perform operations comprising generate a second AGR in the diagram workspace based on identification of the selected action icon, wherein the AGR and the second AGR are sub-actions of the selected action icon.

In one or more embodiments, the processor of the apparatus may be caused to perform operations comprising identify the selected event icon based on an input, the input comprising dragging the selected event icon from the event menu and dropping the selected event icon in the diagram workspace.

In various embodiments, the LGR may comprise an upstream connection and a downstream connection, the upstream connection connected to the EGR and the downstream connection connected to the AGR, wherein the upstream connection to the EGR indicates that simulation of the task associated with the AGR occurs in response to simulation of the event associated with the EGR.

Some embodiments described herein may include a computer-implemented method, comprising one or more of: presenting an interactive workspace, the interactive workspace to include an event menu, an action menu, and a diagram workspace with a reliability block diagram (RBD) and a maintenance arrangement, the RBD including a system device graphical representation (SDGR) associated with a repairable system device (RSD) and the maintenance arrangement to include one or more event graphical representations (EGRs) and one or more action graphical representations (AGRs) associated with the RSD, the event menu including a set of event icons, each event icon in the set of event icons associated with an event to resolve, and the action menu including a set of action icons, each action icon in the set of action icons associated with a task in a set of tasks that correspond to the RSD, wherein a resolution of the event includes a performance of one or more tasks in the set of tasks that correspond to the RSD; identifying a selected event icon in the event menu, the selected event icon included in the set of event icons; generating an EGR associated with the selected event icon in the maintenance arrangement of the diagram workspace in response to identification of the selected event icon; identifying a selected action icon in the action menu, the selected action icon included in the set of action icons; generating an AGR associated with the selected action icon in the maintenance arrangement of the diagram workspace in response to identification of the selected action icon; graphically connecting the EGR to the AGR in the maintenance arrangement of the diagram workspace with a linking graphical representation (LGR) to indicate that a resolution of the event associated with the EGR depends on performance of a task associated with the AGR that corresponds to the RSD; and performing a simulation of one or more of the events associated with the EGR or the tasks associated with the AGR, wherein the simulation comprises a type of simulation for a reliability, availability, and maintainability (RAM) simulation.

In various embodiments, the event associated with the EGR may comprise a failure of the RSD or scheduled actions associated with the RSD based on a calendar or a usage of the RSD and, the task associated with the AGR comprising one or more of a replacement of the RSD with a new device, a repair of the RSD, an inspection of the RSD, an adjustment of the RSD, or an evaluation of the RSD.

In one or more embodiments, the computer-implemented method may include determining one or more of a spare part supply, a workforce availability, or a supply chain state that corresponds to performance of the task associated with the AGR.

In some embodiments, the diagram workspace may comprise a second AGR connected to the EGR with a second LGR in parallel with the LGR, wherein connection of the EGR to the second AGR with the second LGR in parallel with connection of the EGR to the AGR with the LGR indicates the AGR and the second AGR are simulated in parallel.

In various embodiments, the diagram workspace may comprise a window with a first panel for the diagram workspace, a second panel for the event menu, and a third panel for the action menu.

In one or more embodiments, the computer-implemented method may include one or more of: presenting a graphical control element within the diagram workspace; and graphically connecting the EGR to the AGR with the LGR in the diagram workspace based on a manipulation of the graphical control element.

In some embodiments, the EGR may comprise a non-maintenance event associated with testing or changing usage load of the RSD.

In various embodiments, the computer-implemented method may include generating a second AGR in the diagram workspace based on identification of the selected action icon, wherein the AGR and the second AGR are sub-actions of the selected action icon.

In one or more embodiments, the computer-implemented method may include identifying the selected event icon based on an input, the input comprising dragging the selected event icon from the event menu and dropping the selected event icon in the diagram workspace.

In some embodiments, the LGR may comprise an upstream connection and a downstream connection, the upstream connection connected to the EGR and the downstream connection connected to the AGR, wherein the upstream connection to the EGR indicates that simulation of the task associated with the AGR occurs in response to simulation of the event associated with the EGR.

Various embodiments described herein may include a computer-program product tangibly embodied in a non-transitory machine-readable storage medium, the computer-program product including instructions operable to cause a processor to perform operations comprising one or more of: present an interactive workspace, the interactive workspace to include an event menu, an action menu, and a diagram workspace with a reliability block diagram (RBD) and a maintenance arrangement, the RBD to include a system device graphical representation (SDGR) associated with a repairable system device (RSD) and the maintenance arrangement to include one or more event graphical representations (EGRs) and one or more action graphical representations (AGRs) associated with the RSD, the event menu to include a set of event icons, each event icon in the set of event icons associated with an event to resolve, and the action menu to include a set of action icons, each action icon in the set of action icons associated with a task in a set of tasks that correspond to the RSD, wherein a resolution of the event includes a performance of one or more tasks in the set of tasks that correspond to the RSD; identify a selected event icon in the event menu, the selected event icon included in the set of event icons; generate an EGR associated with the selected event icon in the maintenance arrangement of the diagram workspace in response to identification of the selected event icon; identify a selected action icon in the action menu, the selected action icon included in the set of action icons; generate an AGR associated with the selected action icon in the maintenance arrangement of the diagram workspace in response to identification of the selected action icon; graphically connect the EGR to the AGR in the maintenance arrangement of the diagram workspace with a linking graphical representation (LGR) to indicate that a resolution of the event associated with the EGR depends on performance of a task associated with the AGR that corresponds to the RSD; and perform a simulation of one or more of the events associated with the EGR or the tasks associated with the AGR, wherein the simulation comprises a type of simulation for a reliability, availability, and maintainability (RAM) simulation.

In some embodiments, the event associated with the EGR may comprise a failure of the RSD or scheduled actions associated with the RSD based on a calendar or a usage of the RSD and, the task associated with the AGR comprising one or more of a replacement of the RSD with a new device, a repair of the RSD, an inspection of the RSD, an adjustment of the RSD, or an evaluation of the RSD.

In one or more embodiments, the computer-program product may include instructions operable to cause the processor to perform operations comprising determining one or more of a spare part supply, a workforce availability, or a supply chain state that corresponds to performance of the task associated with the AGR.

In various embodiments, the diagram workspace may comprise a second AGR connected to the EGR with a second LGR in parallel with the LGR, wherein connection of the EGR to the second AGR with the second LGR in parallel with connection of the EGR to the AGR with the LGR indicates the AGR and the second AGR are simulated in parallel.

In some embodiments, the diagram workspace may comprise a window with a first panel for the diagram workspace, a second panel for the event menu, and a third panel for the action menu.

In one or more embodiments, the computer-program product may include instructions operable to cause the processor to perform operations comprising one or more of: present a graphical control element within the diagram workspace; and graphically connect the EGR to the AGR with the LGR in the diagram workspace based on a manipulation of the graphical control element.

In various embodiments, the EGR may comprise a non-maintenance event associated with testing or changing usage load of the RSD.

In some embodiments, the computer-program product may include instructions operable to cause the processor to perform operations comprising generate a second AGR in the diagram workspace based on identification of the selected action icon, wherein the AGR and the second AGR are sub-actions of the selected action icon.

In one or more embodiments, the computer-program product may include instructions operable to cause the processor to perform operations comprising identify the selected event icon based on an input, the input comprising dragging the selected event icon from the event menu and dropping the selected event icon in the diagram workspace.

In various embodiments, the LGR may comprise an upstream connection and a downstream connection, the upstream connection connected to the EGR and the downstream connection connected to the AGR, wherein the upstream connection to the EGR indicates that simulation of the task associated with the AGR occurs in response to simulation of the event associated with the EGR.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIGS. 16A-16D illustrate block diagrams of exemplary menus in an interactive workspace, according to some embodiments of the present technology.

FIG. 19 illustrates an example embodiment of a logic flow.

DETAILED DESCRIPTION

Figure 1:
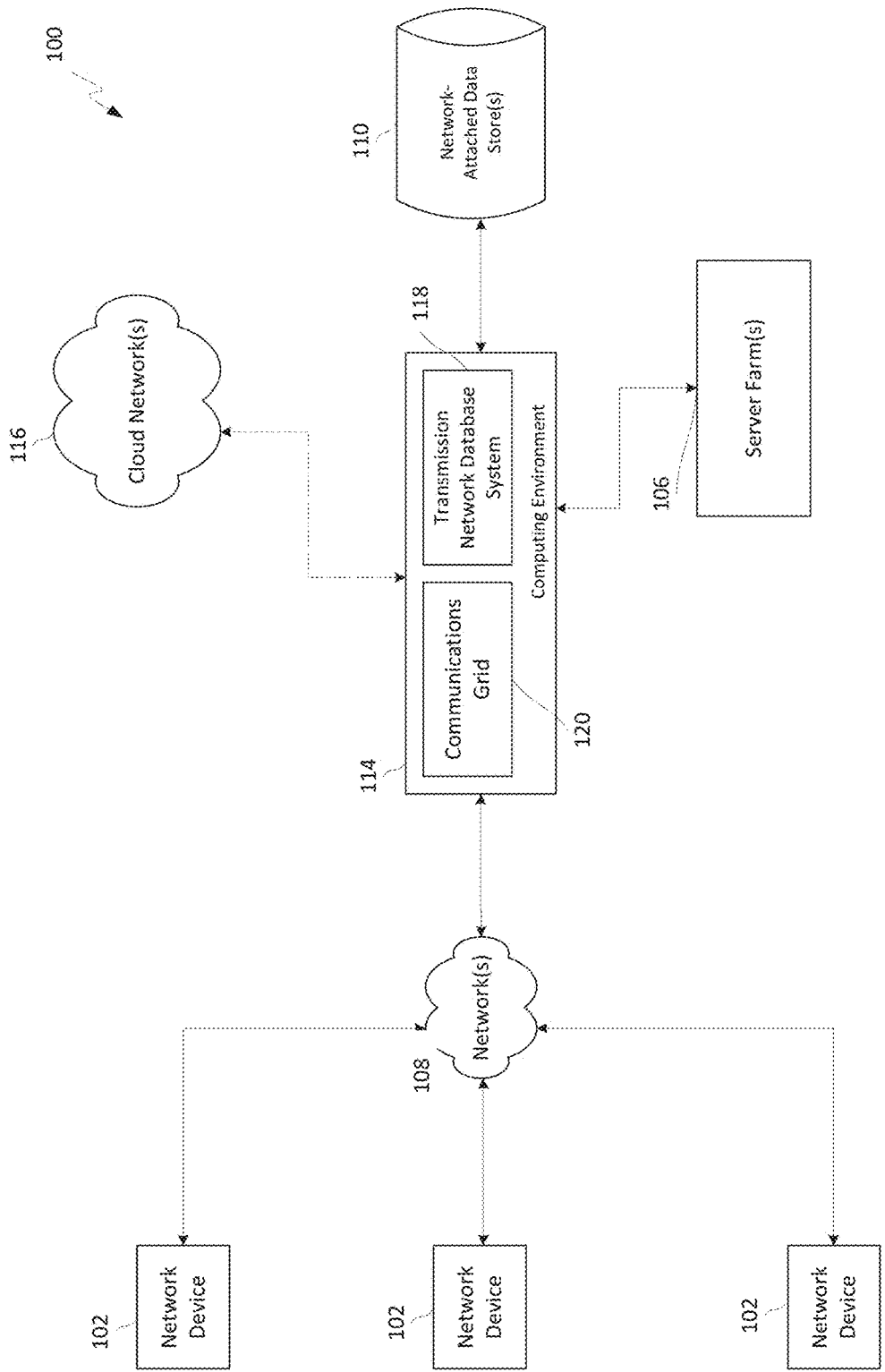
FIG. 1 illustrates a block diagram that provides an illustration of the hardware components of a computing system, according to some embodiments of the present technology.

Various embodiments are generally directed to systems for designing, generating, and/or creating maintenance arrangements for repairable systems in an interactive workspace, such as for simulation of maintenance events. Some embodiments are particularly directed to an interactive workspace that enables intuitive modeling of a maintenance arrangement associated with one or more components in a reliability block diagram (RBD). In various embodiments, the interactive workspace may include a diagram workspace with the RBD, an event menu, and an action menu. In one or more described herein, a system maintenance arrangement for one or more components of the RBD may be generated in a diagram workspace by associating events selected from the event menu with one or more components in an RBD; and by associating actions selected from the action menu with one or more events via the addition of linking elements. In one or more such embodiments, resolution of an occurrence of an event, such as during a simulation, may depend on performance or simulated performance of the actions associated with the event via linking elements. For instance, the event may be a component failure and the actions to resolve the component failure may include one or more of activating a backup, replacing the failed component with a new component, activating the new component, and deactivating the backup. In one or more embodiments, the maintenance arrangement may be utilized in a system reliability, availability, and maintainability (RAM) simulation. These and other embodiments are described and claimed.

Some challenges facing systems for designing, generating, and/or creating maintenance arrangements include interface designs that are inadequate to convey complex descriptions associated with maintenance arrangements for repairable systems. These challenges may result in the inability to provide a diagrammatic formalism for system maintenance arrangements. For instance, creation of a maintenance arrangement may require extensive and/or intensive access to non-intuitive dialog interfaces (e.g., dialog boxes, text terminals, and the like). In such instances, creation of the maintenance arrangement may require direct implementation via a general-purpose computer language, such as C or C++. However, programming from the ground up is time consuming. Additional challenges include the inability to assign an arbitrary number of maintenance actions to the component under the maintenance; the inability to assign maintenance actions according to the event that does not occur on the component under maintenance; and/or the inability to assign multiple maintenance actions in customizable orders.

Adding further complexity, in order to study repairable systems, one may have to first describe the system, and then describe the maintenance arrangement. However, RBDs do not include graphical representations of maintenance arrangements. In the absence of a graphical representation of a maintenance arrangement, an overall understanding of the maintenance may be difficult or impossible to achieve. Further, editing a maintenance arrangement with numerous actions and events may require tedious access to a large number of dialog boxes. For example, in order to add a piece of a maintenance arrangement, one may need to find a dialog, choose the component to be maintained, choose between maintain upon component failure and maintain according to schedule, choose between maintain by replacing and maintain by minimal repair, and specify the time that the maintenance will take. That are all what user can specify. These and other factors may result in systems designing, generating, and/or creating maintenance arrangements for repairable system with steep learning curves, confusing interfaces, inefficient processes, and limited capabilities. An additional source of complexity includes the inability to overlay a system maintenance arrangement with an RBD. Such limitations can drastically reduce the usability and applicability of the maintenance arrangements, contributing to nonintuitive interfaces with limited flexibility.

Various embodiments described herein include an interactive workspace that utilizes a diagrammatic formalism for system maintenance arrangements and/or interface design attributes that are intuitive and/or enable flexibility for customization. Some embodiments may include an interactive workspace wherein a maintenance arrangement may be generated by creating association between repairable system devices, events, and/or actions by connecting respective graphical representations with a set of linking graphical representations. In one or more embodiments, the graphical representation of the maintenance arrange may be overlaid or at least displayed in conjunction with an RBD. In various embodiments, the diagrammatic formalism for system maintenance arrangements and/or interface design attributes may be created, adjusted, or utilized to provide a graphical user interface (GUI) that improves productivity via one or more benefits or advantages described herein. Additionally, the interactive workspace may include the ability to assign an arbitrary number of maintenance actions to the component under the maintenance; the ability to assign maintenance actions according to the event that does not occur on the component under maintenance; and/or the ability to assign multiple maintenance actions in customizable orders.

Further, graphical representations of maintenance arrangements may improve identification and/or comprehension of a problem on interest. Various embodiments address the frequency and type of maintenance potentially applied to a repairable system, resulting in improved functionality. In these and other ways, the interactive workspace may enable customized, efficient, and accurate interfaces for the design, generation, creation, and/or simulation of maintenance arrangements for repairable systems, resulting in several technical effects and advantages. In various embodiments, the interactive workspace may be implemented via one or more computing devices, and thereby provide additional and useful functionality to the one or more computing devices, resulting in more capable and better functioning computing devices. For example, the interactive workspace may enable a computing device to assist a user without fine motor skills with designing, generating, creating and/or simulating maintenance arrangements for repairable systems. One or more embodiments can improve safety associated with performance of maintenance operations by providing a clear action plan to resolve maintenance events.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
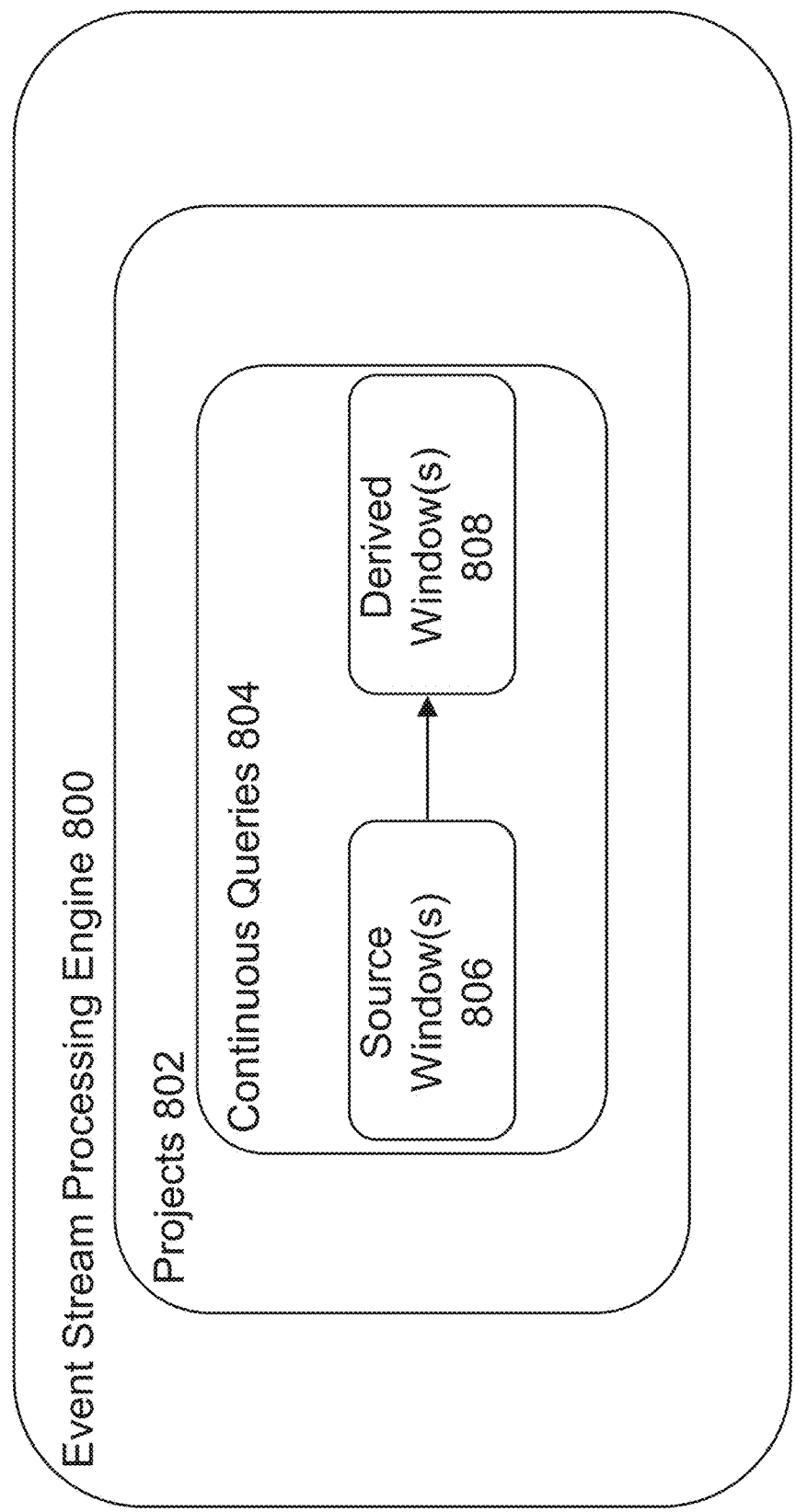
FIG. 8 illustrates a block diagram including components of an Event Stream Processing Engine (ESPE), according to embodiments of the present technology.
Figure 9:
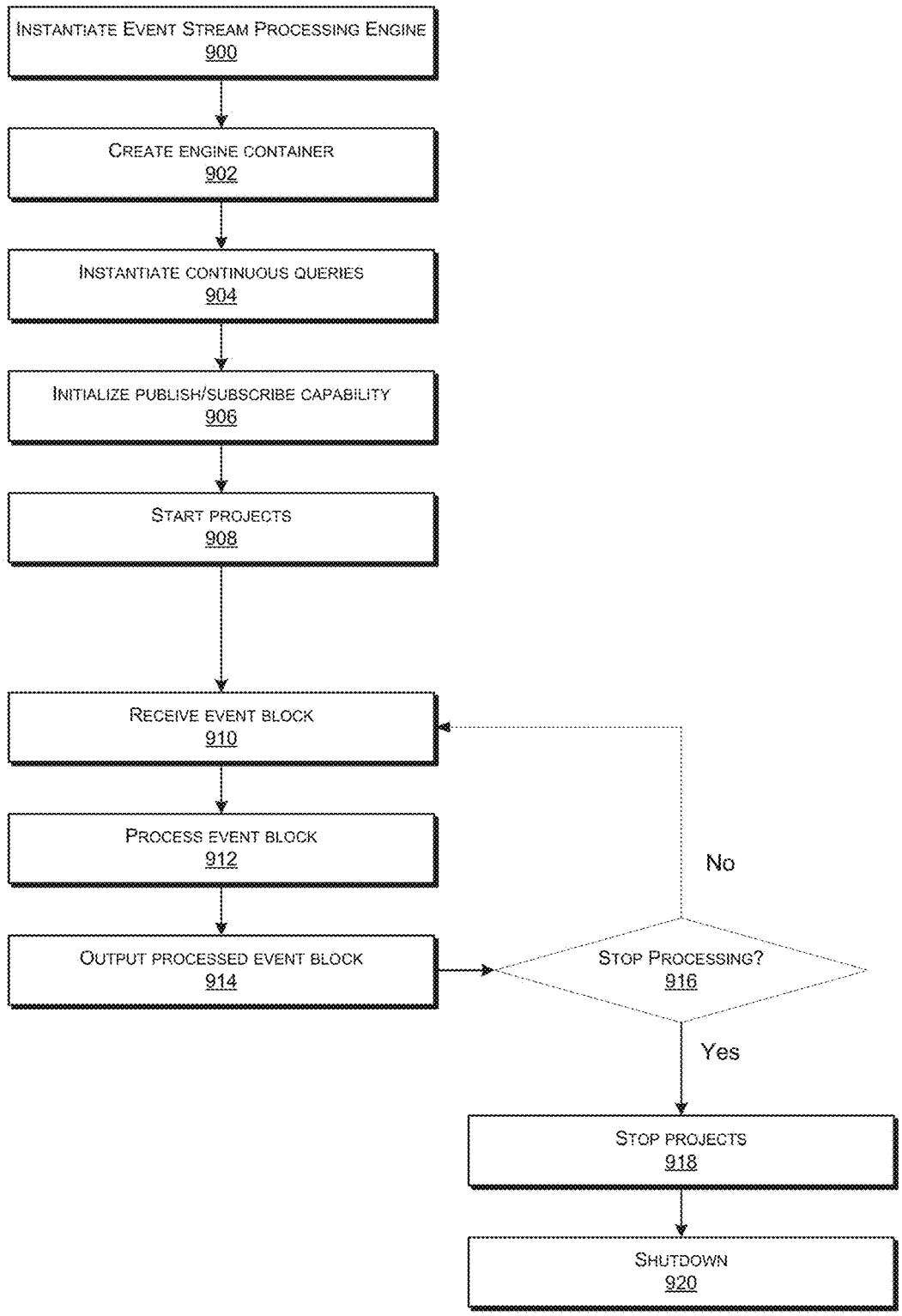
FIG. 9 illustrates a flow chart showing an example process including operations performed by an event stream processing engine, according to some embodiments of the present technology.
Figure 10:
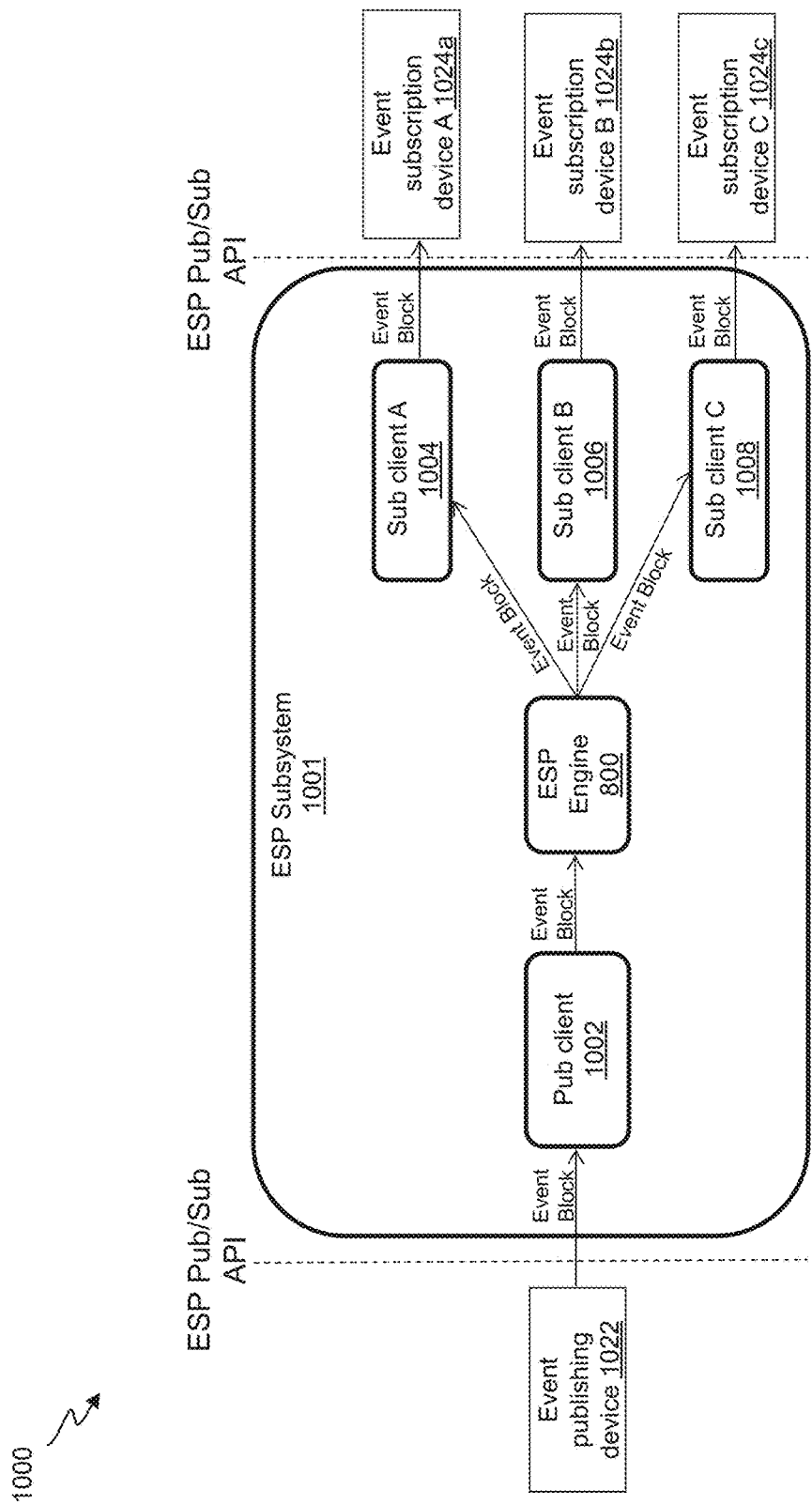
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms.

Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
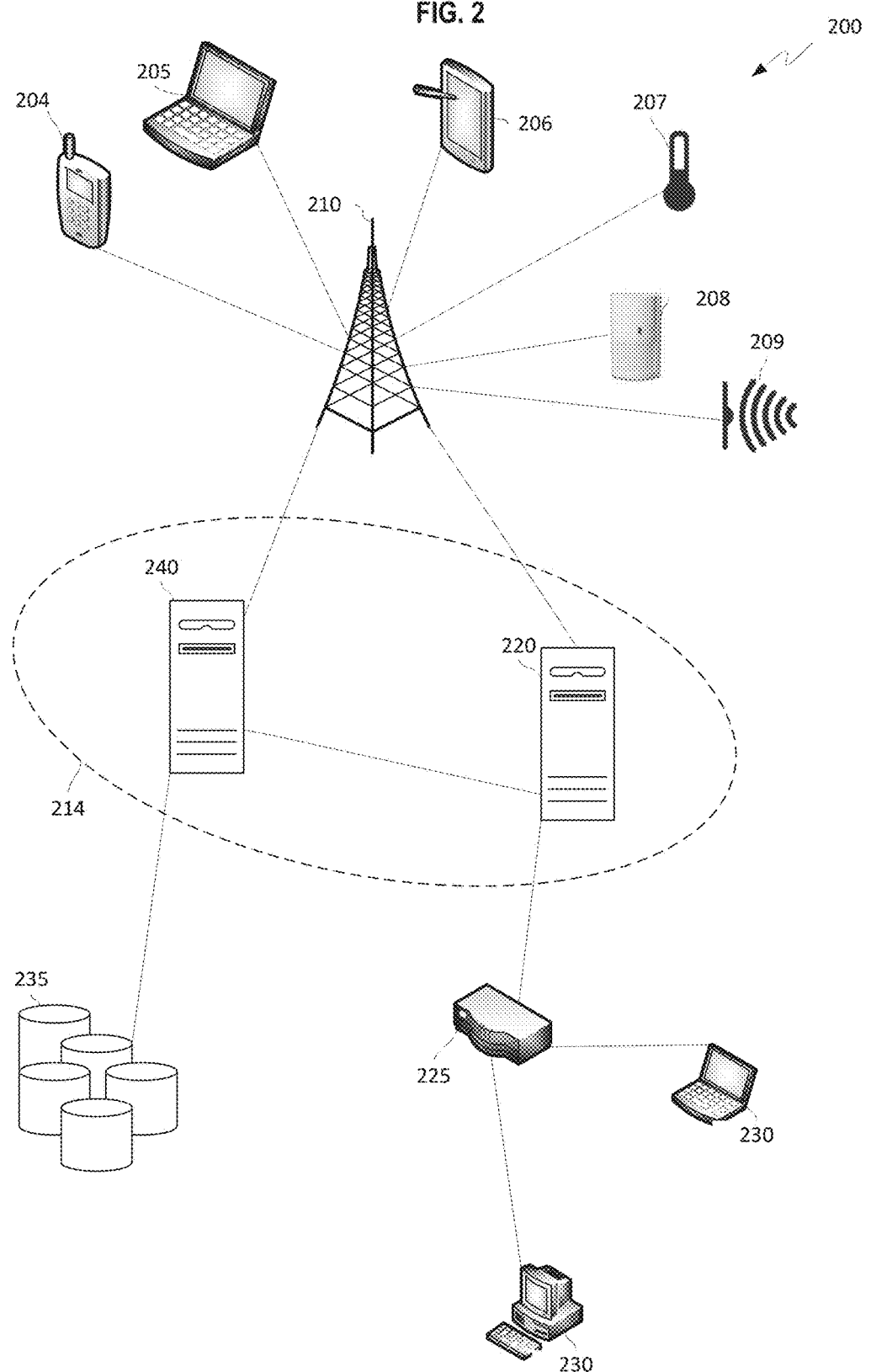
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values computed from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
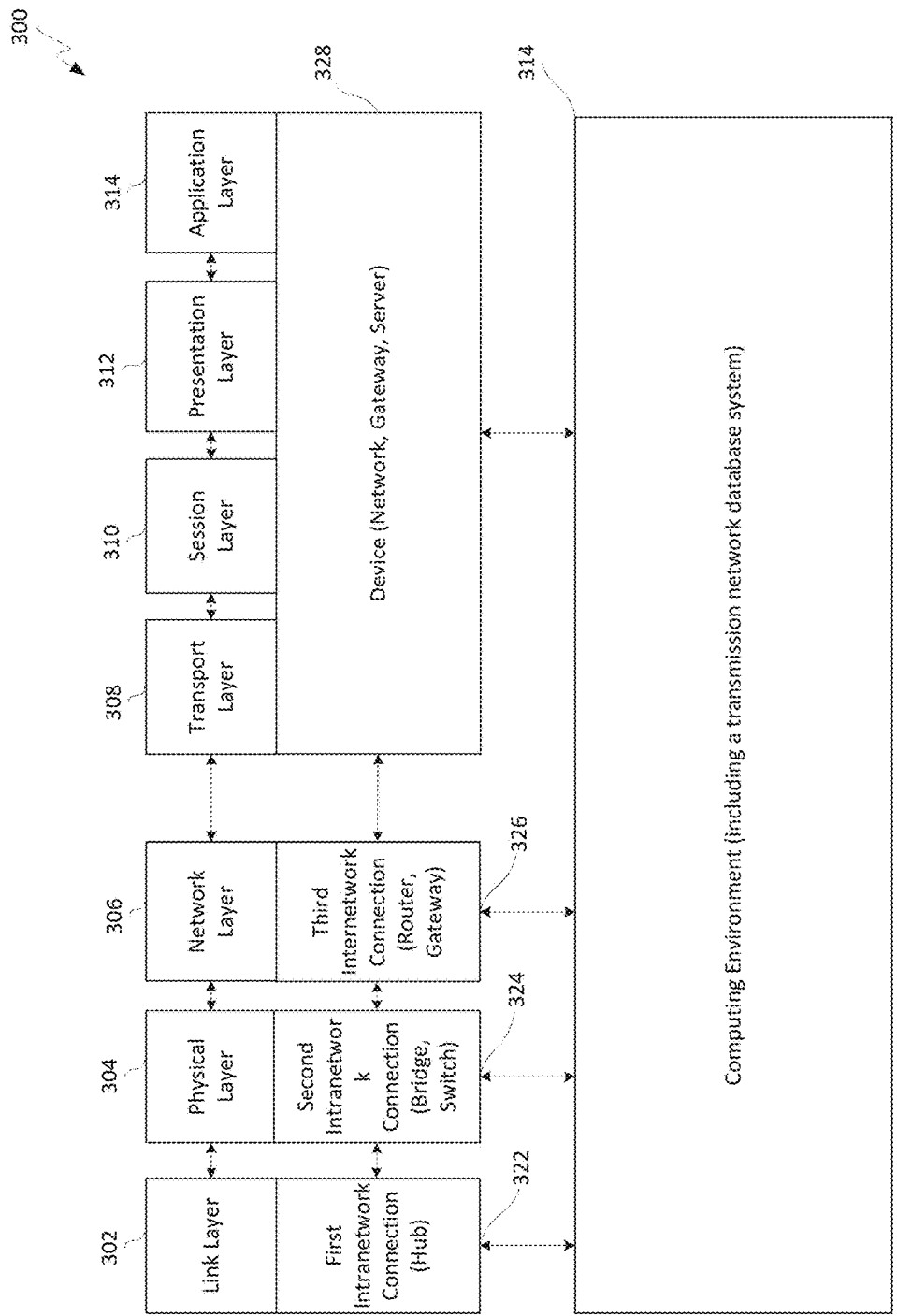
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types and/or encodings known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
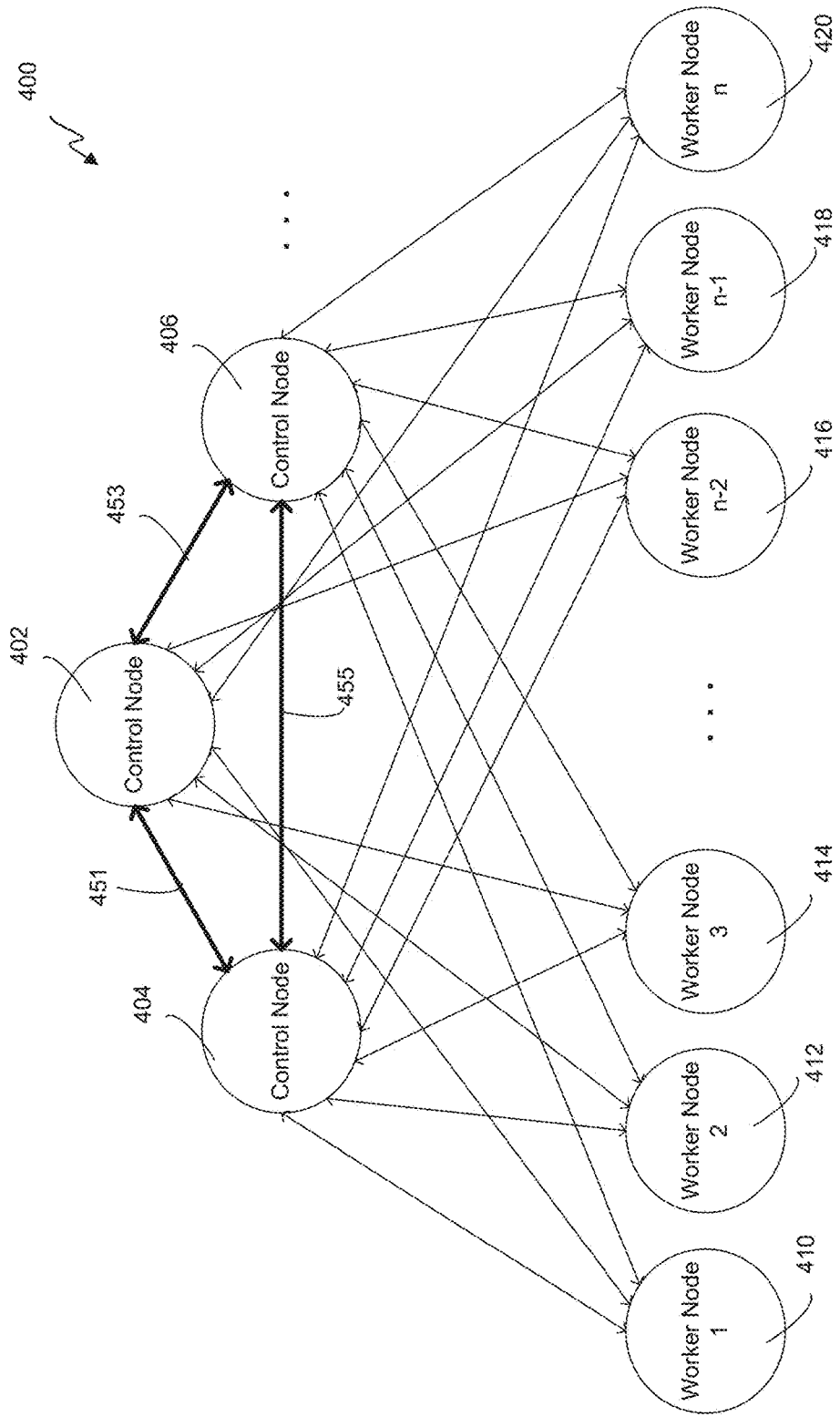
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a Hadoop data node employing Hadoop Distributed File System, or HDFS).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node, other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
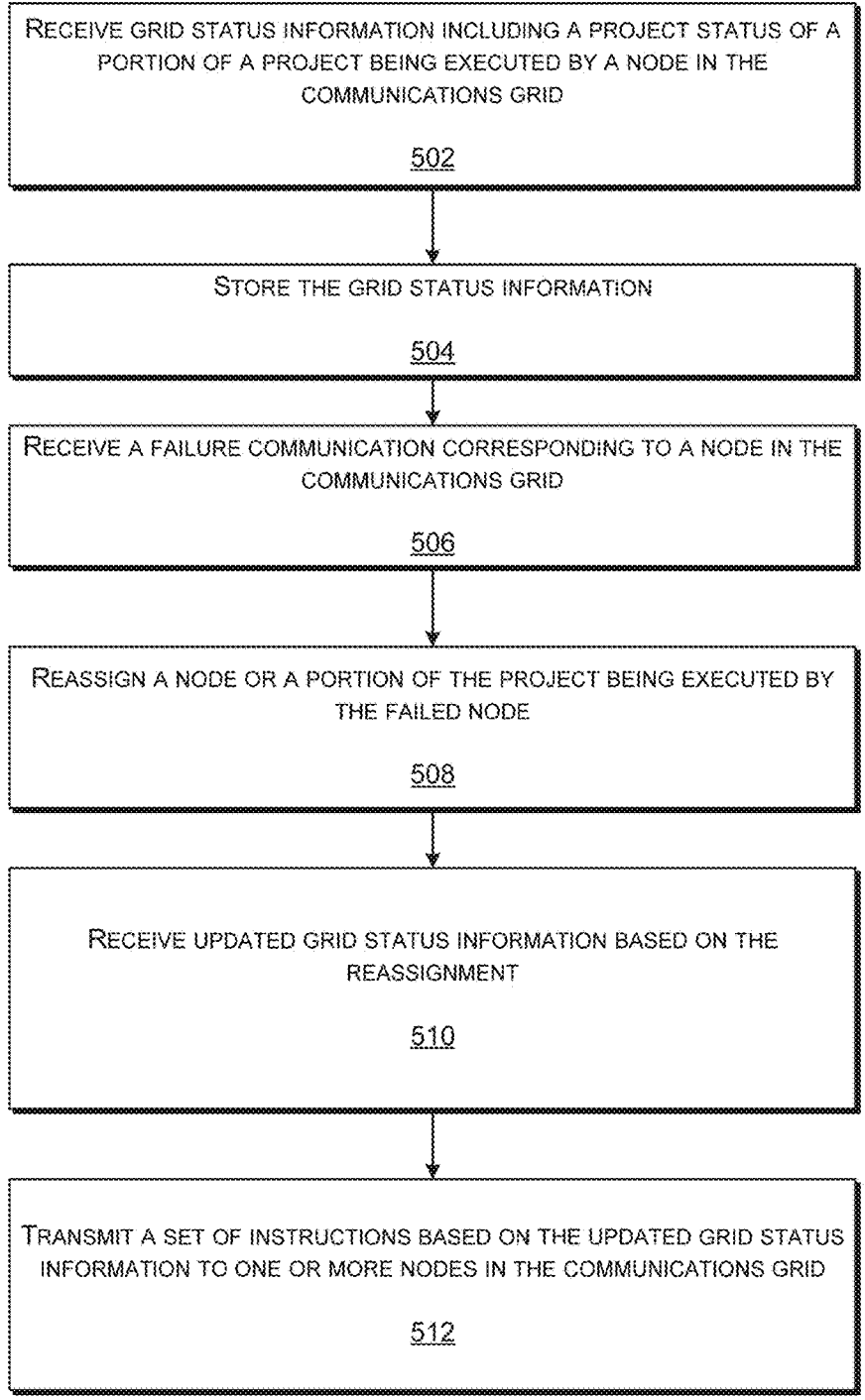
FIG. 5 illustrates a flow chart showing an example process for adjusting a communications grid or a work project in a communications grid after a failure of a node, according to some embodiments of the present technology.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
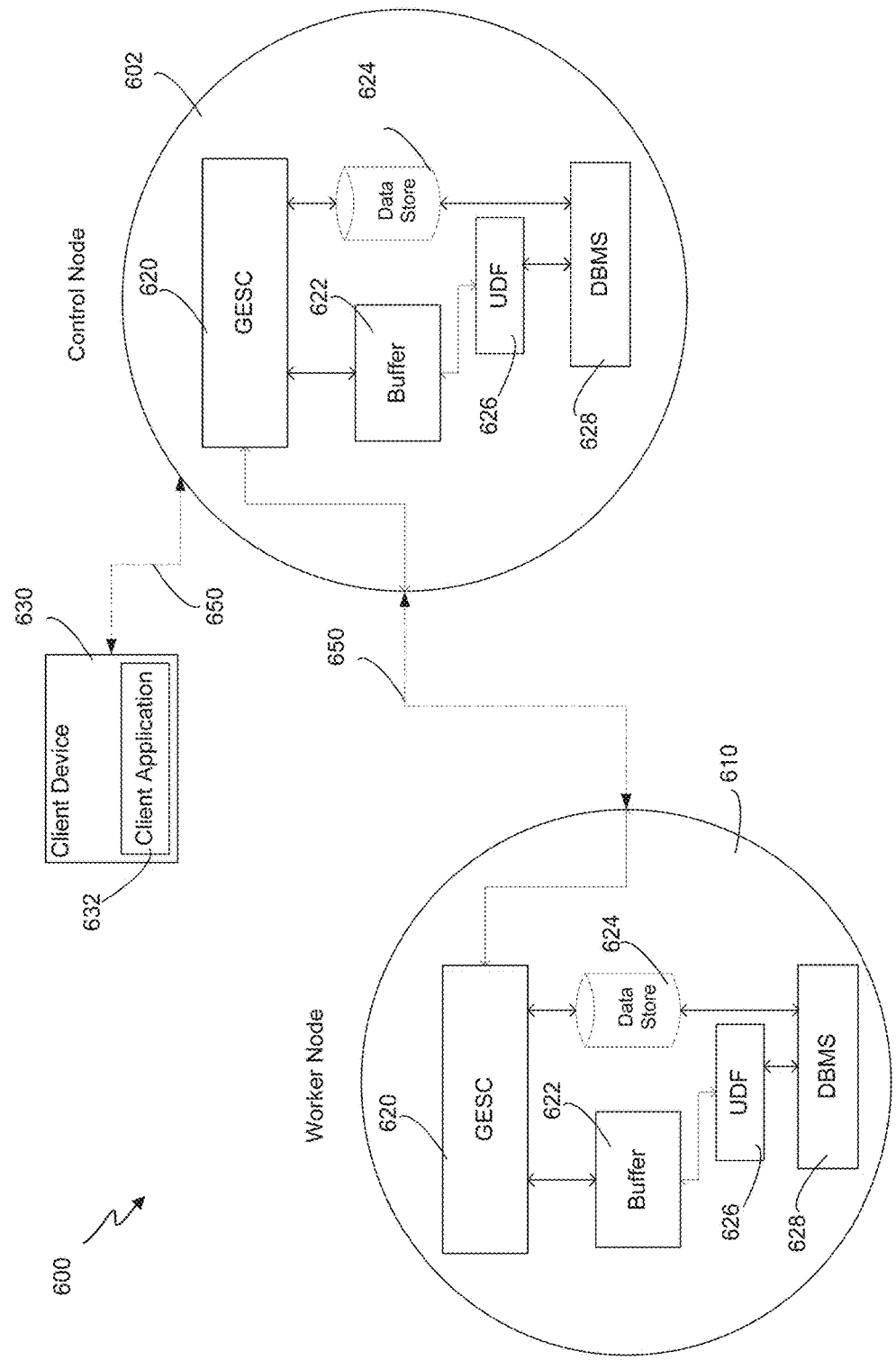
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a node 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
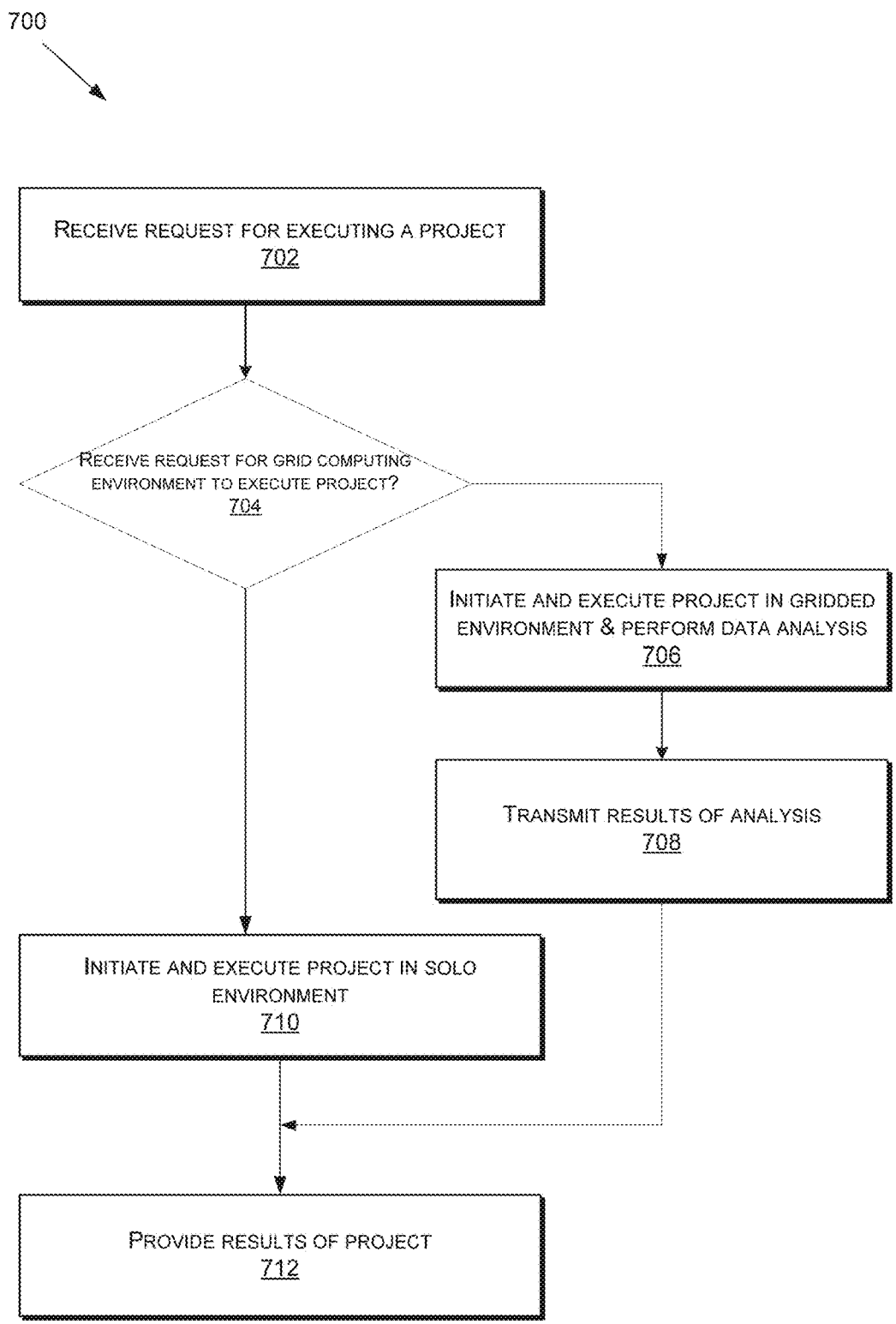
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 874a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop-down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 850 interfacing between publishing device 872 and event subscribing devices 874*a-c*, according to embodiments of the present technology. ESP system 850 may include ESP device or subsystem 851, event publishing device 872, an event subscribing device A 874*a*, an event subscribing device B 874*b*, and an event subscribing device C 874*c*. Input event streams are output to ESP device 851 by publishing device 872. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 874*a*, event subscribing device B 874*b*, and event subscribing device C 874c. ESP system 850 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 872, to publish event streams into ESPE 800 or an event subscriber, such as event subscribing device A 874a, event subscribing device B 874b, and event subscribing device C 874c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 872, and event subscription applications instantiated at one or more of event subscribing device A 874a, event subscribing device B 874b, and event subscribing device C 874c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 872.

ESP subsystem 800 may include a publishing client 852, ESPE 800, a subscribing client A 854, a subscribing client B 856, and a subscribing client C 858. Publishing client 852 may be started by an event publishing application executing at publishing device 872 using the publish/subscribe API. Subscribing client A 854 may be started by an event subscription application A, executing at event subscribing device A 874a using the publish/subscribe API. Subscribing client B 856 may be started by an event subscription application B executing at event subscribing device B 874b using the publish/subscribe API. Subscribing client C 858 may be started by an event subscription application C executing at event subscribing device C 874c using the publish/subscribe API.

An event block object containing one or more event objects is injected into a source window of the one or more source windows 806 from an instance of an event publishing application on event publishing device 872. The event block object may be generated, for example, by the event publishing application and may be received by publishing client 852. A unique ID may be maintained as the event block object is passed between the one or more source windows 806 and/or the one or more derived windows 808 of ESPE 800, and to subscribing client A 854, subscribing client B 806, and subscribing client C 808 and to event subscription device A 874a, event subscription device B 874b, and event subscription device C 874c. Publishing client 852 may further generate and include a unique embedded transaction ID in the event block object as the event block object is processed by a continuous query, as well as the unique ID that publishing device 872 assigned to the event block object.

In an operation 912, the event block object is processed through the one or more continuous queries 804. In an operation 914, the processed event block object is output to one or more computing devices of the event subscribing devices 874a-c. For example, subscribing client A 804, subscribing client B 806, and subscribing client C 808 may send the received event block object to event subscription device A 874a, event subscription device B 874b, and event subscription device C 874c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 872, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11A:
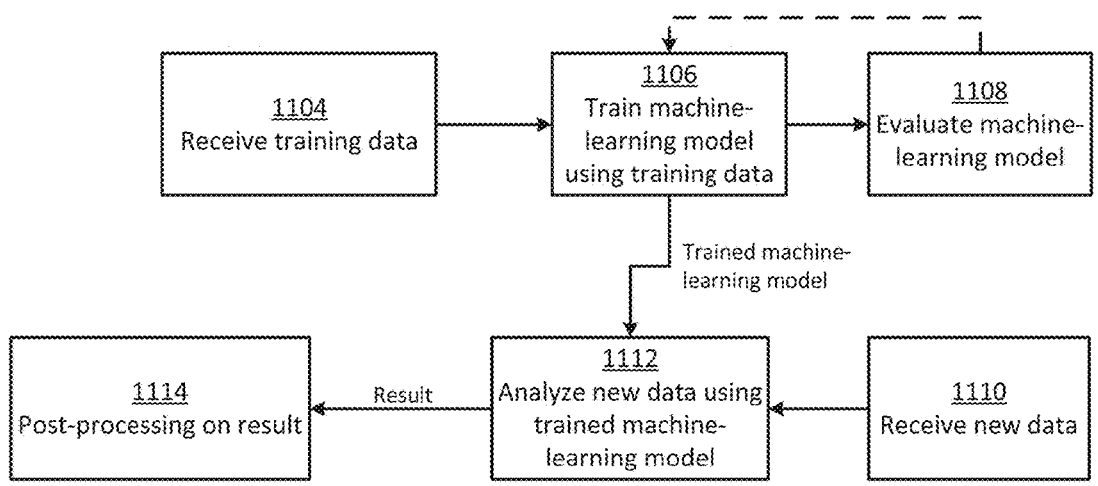
FIG. 11A illustrates a flow chart showing an example process for generating and using a machine-learning model, according to some embodiments of the present technology.

FIG. 11A is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11A.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 11B:
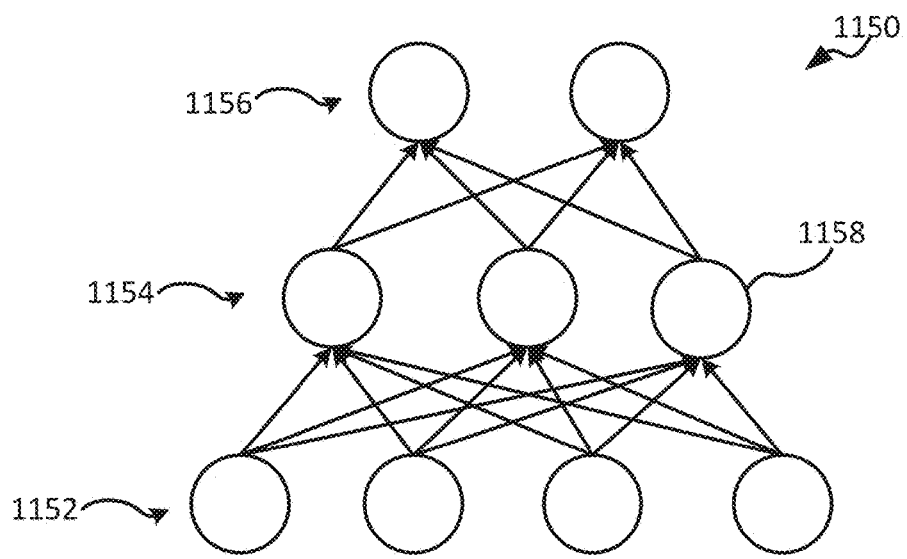
FIG. 11B illustrates a neural network including multiple layers of interconnected neurons, according to some embodiments of the present technology.

A more specific example of a machine-learning model is the neural network 1150 shown in FIG. 11B. The neural network 1150 is represented as multiple layers of interconnected neurons, such as neuron 1158, that can exchange data between one another. The layers include an input layer 1152 for receiving input data, a hidden layer 1154, and an output layer 1156 for providing a result. The hidden layer 1154 is referred to as hidden because it may not be directly observable or have its input directly accessible during the normal functioning of the neural network 1150. Although the neural network 1150 is shown as having a specific number of layers and neurons for exemplary purposes, the neural network 1150 can have any number and combination of layers, and each layer can have any number and combination of neurons.

The neurons and connections between the neurons can have numeric weights, which can be tuned during training. For example, training data can be provided to the input layer 1152 of the neural network 1150, and the neural network 1150 can use the training data to tune one or more numeric weights of the neural network 1150. In some examples, the neural network 1150 can be trained using backpropagation. Backpropagation can include determining a gradient of a particular numeric weight based on a difference between an actual output of the neural network 1150 and a desired output of the neural network 1150. Based on the gradient, one or more numeric weights of the neural network 1150 can be updated to reduce the difference, thereby increasing the accuracy of the neural network 1150. This process can be repeated multiple times to train the neural network 1150. For example, this process can be repeated hundreds or thousands of times to train the neural network 1150.

In some examples, the neural network 1150 is a feed-forward neural network. In a feed-forward neural network, every neuron only propagates an output value to a subsequent layer of the neural network 1150. For example, data may only move one direction (forward) from one neuron to the next neuron in a feed-forward neural network.

In other examples, the neural network 1150 is a recurrent neural network. A recurrent neural network can include one or more feedback loops, allowing data to propagate in both forward and backward through the neural network 1150. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1150 operates by receiving a vector of numbers from one layer; transforming the vector of numbers into a new vector of numbers using a matrix of numeric weights, a nonlinearity, or both; and providing the new vector of numbers to a subsequent layer of the neural network 1150. Each subsequent layer of the neural network 1150 can repeat this process until the neural network 1150 outputs a final result at the output layer 1156. For example, the neural network 1150 can receive a vector of numbers as an input at the input layer 1152. The neural network 1150 can multiply the vector of numbers by a matrix of numeric weights to determine a weighted vector. The matrix of numeric weights can be tuned during the training of the neural network 1150. The neural network 1150 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 1154, of the neural network 1150. The subsequent layer of the neural network 1150 can receive the transformed output, multiply the transformed output by a matrix of numeric weights and a nonlinearity, and provide the result to yet another layer of the neural network 1150. This process continues until the neural network 1150 outputs a final result at the output layer 1156.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

According to embodiments discussed herein, the above-described computing devices and systems may be utilized for the design, creation, generation, and/or simulation of maintenance arrangements for repairable systems. In one or more embodiments, one or more of design, create, and generate may be used interchangeably with respect to maintenance arrangements. Graphical representations of maintenance arrangements may be used to clearly communicate relevant parts of the maintenance arrangements in an efficient and effective manner, resulting in a computing device and/or system with exclusive and advantageous capabilities. For example, generating a maintenance arrangement with graphical representations may enable a user without fine motor skills to model and/or simulate maintenance arrangements. In another example, creating maintenance arrangements in an interactive workspace as described in one or more embodiments here may improve safety by providing clear action plans to resolve events as well as the ability to design, create, and/or simulate various action plans.

In some embodiments, the above-described computing devices and systems may implement interactive workspace to generate graphical representations of maintenance arrangements for repairable systems. In various embodiments, one or more of the graphical representations of maintenance arrangements may be overlaid on an RBD of the associated repairable system. In various embodiments, implementation of the interactive workspace may include utilizing machine-learning techniques to learn user preferences and/or improve recommendations, such recommendations may include the selections provided in or with one or more menus or workspaces described herein. For example, associations in previously-created maintenance arrangements may be used to provide more relevant actions in the action menu when a certain event is selected. These and other features of the interactive workspace may enable a computing device and/or system implementing the interactive workspace to realize unique and advantageous functionalities, resulting in improved computer simulations, improved designs, improved maintenance for repairable systems, and improved components.

Figure 12:
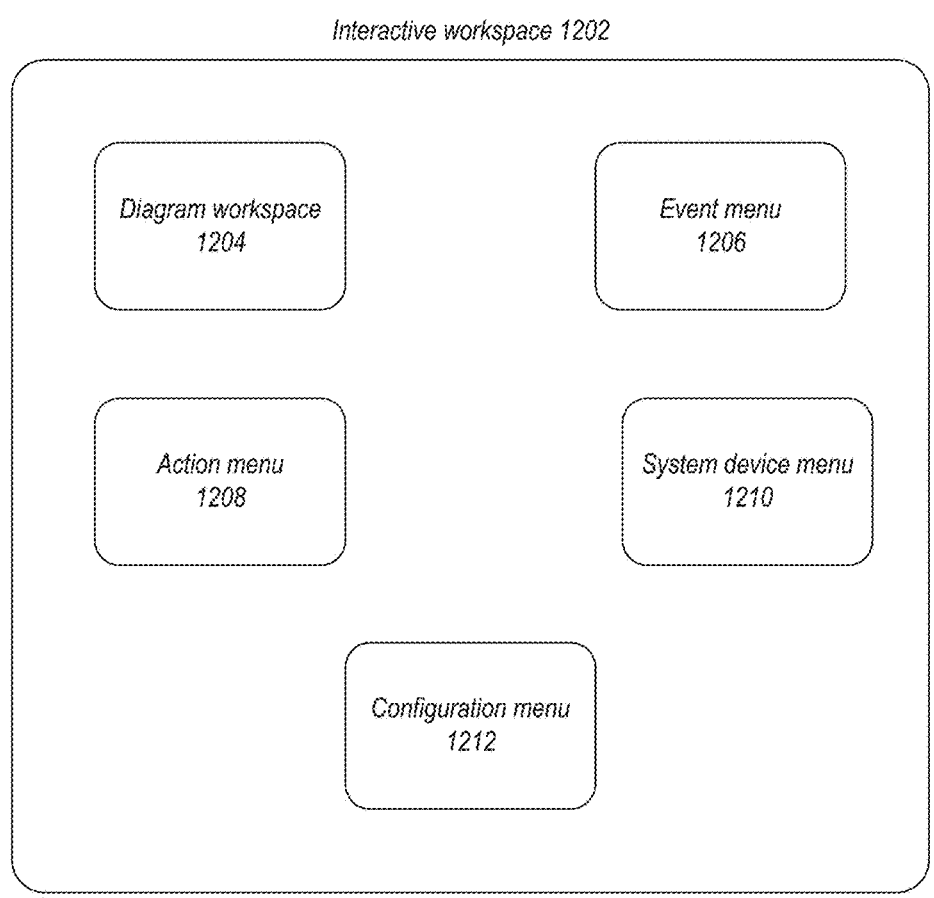
FIG. 12 illustrates a block diagram of an exemplary interactive workspace, according to some embodiments of the present technology.

FIG. 12 illustrates a block diagram of an example interactive workspace 1202 that may be representative of various embodiments. In one or more embodiments described herein, interactive workspace 1202 may provide an interface for a user to design, generate, create, and/or simulate maintenance arrangements for repairable systems. In one or more such embodiments, this may include specifying a combination of a timing pattern for an event and actions that change reliability characteristics of components associated with the event. For instance, a power generator that runs six months on lower stress, then six months on higher stress, and repeats the cycle; this duty cycle may correspond to a common scenario in power generation for residential customers because during the summer, consumption is high due to air conditioning and during the winter, consumption is low due to alternative fuel heating sources. In such instances, interactive workspace 1202 may be utilized to simulate the duty cycle such that the generator is more likely to fail under higher stress than under lower stress. In some embodiments, solutions may be crafted by building one or more event-action sub-diagrams. In some such embodiments, this may enable flexibility and/or reduce or remove the need for the addition of special purposed components to the interactive workspace 1202. In various embodiments, interactive workspace 1202 may provide a diagrammatic formalism for system maintenance arrangements. In some embodiments, design attributes of the interactive workspace 1202 may provide intuitive operations and flexibility for customization. Embodiments are not limited in this context.

In one or more embodiments, the interactive workspace 1204 may provide one or more of the following advantageous features. First, it may enable description of system reliability and maintenance in a single diagram, referred to as a repairable system simulation (RSS) diagram. This may eliminate inabilities to understand connections between an RBD and a maintenance arrangement, removing a barrier to conveying the integral design of system reliability and maintenance. Second, it may provide a graphical user interface (GUI) designed to be dynamic and adaptive. For instance, the GUI (e.g., interface of interactive workspace 1202) may be adapted to the progression of user interaction with the system. In some such instances, this may enable the interactive workspace to identify relevant user controls, such as based on heuristic guess, and dynamically provide intuitive access thereto. Third, it may provide a GUI that is modularly designed, and extensible. For example, the design may be easily applied to other related parties in repairable system simulation, such as spare part supply, supply chain, workforce scheduling, etcetera. Fourth, it may be employable in simulation software for system planning, improvement, and maintenance scheduling, prediction planning, unplanned system outages, and the like, providing a useful tool for users, such as engineers, scientists, reliability engineers and technicians, quality improvement professionals in a variety of fields (e.g., manufacturing system design and management, semiconductors, national defense, military, utilities, aerospace, automotive, durable goods manufacturers, robotics, etcetera).

In FIG. 12, interactive workspace 1202 may include diagram workspace 1204, event menu 1206, action menu 1208, system device menu 1210, and configuration menu 1212. In various embodiments, the components of interactive workspace 102 may interoperate to provide an intuitive and adaptable interface for designing, generating, and/or creating maintenance arrangements for repairable systems, such as for simulation of maintenance events affecting a repairable system device (RSD). In one or more embodiments, devices in the repairable system may be represented with one or more components in a reliability block diagram (RBD). In some embodiments, the maintenance arrangement may be represented with one or more graphical representations (see e.g., FIG. 13B) displayed in conjunction with the RBD, as an RSS diagram. In various embodiments, diagram workspace 1204 may include a plurality of layers. For instance, a first layer may include the RBD and a second layer may include the maintenance arrangement. In other instances, the RBD and the maintenance arrangement may be included in the same layer. However, in either embodiment the RBD and the maintenance arrangement may be presented simultaneously. In some embodiments, the layers may be arranged in a non-hierarchical arrangement. In one or more embodiments, the plurality of layers may prevent unintended alterations within diagram workspace 1204. For example, by having the RBD and maintenance arrangement on different layers, when the maintenance arrangement is being modified, the layer with the RBD may be locked from modification.

In various embodiments, an RBD may be displayed in interactive workspace 1202, such as in diagram workspace

1204. In various such embodiments, the RBD may have been created in or imported into diagram workspace 1204. In some embodiments, a graphical representation of a system maintenance arrangement for one or more components of the RBD may be generated in the diagram workspace 1204. As described in more detail below, in some such embodiments, this may be accomplished by associating events selected from event menu 1206 with one or more components in the RBD that represent repairable system devices (RSDs); and by associating actions selected from action menu 1208 with one or more events via the addition of linking elements between various graphical representations in diagram workspace 1204. In one or more such embodiments, resolution of an occurrence of an event, such as during a simulation, may depend on performance or simulated performance of the actions associated with the event via linking elements. For instance, the event may be a component failure and the actions to resolve the component failure may include one or more of activating a backup, replacing the failed component with a new component, activating the new component, and deactivating the backup.

In various embodiments, an event may include a maintenance event that requires maintenance actions, such as changing fluids and/or filters. In one or more embodiments, a maintenance event may include events that occur to a component under scheduled maintenance of the component. In some embodiments, an event may include a non-maintenance event, such as testing or changes in usage or load. However, in such embodiments, the non-maintenance events may still trigger or be associated with maintenance actions.

In one or more embodiments, the maintenance arrangement may be utilized in a reliability, availability, and maintainability (RAM) simulations of a repairable system. In various embodiments, the repairable system may be defined using an RBD (e.g., RBD 1308), which may involve reliabilities of individual components and/or structure reliabilities that are defined by the connections among the components. In some embodiments, the repairable system may be maintainable by replacing, repairing, or changing individual components. In many embodiments, the availability (up and down time of the system) of the repairable system may be computed and/or displayed.

More generally, repairable systems may be involved in almost every aspect of modern lives. For instance, small repairable systems may include houses, refrigerators, automobiles, etcetera. In another instance, larger repairable systems may include the networks of communication providers, wind turbines, power plants, etcetera. In one or more embodiments described herein, design, creation, and/or simulation of maintenance arrangements for repairable systems with graphical representations may extend the useful life of equipment, reduce expenses, and/or maximizing production outputs while keeping the repairable system in safe operating condition.

In one or more embodiments, the interactive workspace 1202 may be used to describe a repairable system, and then describe a maintenance arrangement associated with the repairable system. In various embodiments, an RBD may be created or imported to describe the repairable system. In various such embodiments, the RBD may be used to identify or compute the probabilities of the repairable system being reliable or available over time. In some embodiments, reliability may depend on two types of things. The first type may include the reliabilities of the individual components that assemble the system. The second type may include the dependence structures among the components (e.g., backup devices). For instance, if a system is shut down due to critical failures of some components, the system will become unavailable as well. However, if a redundant system is shut down because it is not needed, it will remain available during down time of the primary system. In many embodiments, the computed availabilities may depend on correlation factors related to reliabilities and maintenance arrangements, such as in a reliability function. In many such embodiments, the values of correlation factors may be estimated, and one or more embodiments described herein may serve or help to improve such estimations. Some embodiments may utilize one or more of a variety of techniques associated with RBDs. For example, these techniques may include one or more techniques described in Meeker, W. Q. and L. A. Escobar, 1998, *Statistical Methods for Reliability Data*, Wiley and/or Modarres, M., M P Kaminskiy, and V. Krivtsov, 2010, *Reliability Engineering and Risk Analysis: A Practical Guide*, $2^{nd}$ ed. CRC press.

In some embodiments, interactive workspace 1202 and the included GUI may be designed to increase productivity of a user. In various embodiments, the GUI may assist a user in understanding a problem of interest. For instance, using graphical representations of maintenance arrangements and/or repairable systems may assist a user in understanding the structure of the system. In embodiments of repairable systems that may be described by an RBD and state transitions of individual components (e.g., resulting from occurrence/performance of events/actions), a dynamic RBD approach may become useful, such as described in more detail below.

In various embodiments, interactive workspace 1202 may be implemented or supported by an underlying computational engine. In various such embodiments, the computational engine may serve one or more purposes in the design, creation, and/or simulation of maintenance arrangement described herein. For instance, the computational engine may compute simulations of a maintenance arrangement and/or RBD. In some embodiments, the computational engine may utilize one or more of discrete event simulation and continuous time simulation of a repairable system. For instance, a hybrid of discrete event simulation and continuous time simulation may be used. In some such embodiments, this may include a computational engine based on Petri Nets, such as those described in Robidoux, R., H. Xu, L. Xing, and M. Zhou, 2010, "Automated Modeling of Dynamic Reliability Block Diagrams Using Colored Petri Nets", in *IEEE Transactions on Systems, Man, and Cybernetics—Part A: Systems and Humans*, vol. 40, no. 2, pp. 337-351.

In many embodiments, discrete event simulation may be used. In many such embodiments, discrete event simulation may provide a solution to many repairable system simulation problems. In embodiments, a discrete event simulator may be a discrete event system. In such embodiments, a discrete event system may propagate forward along a time line by producing events, such as one after the other. In various embodiments, the occurrence of the next event can always be calculated if the system is deterministic, or sampled if the system stochastic. In some embodiments, a state change of a system between consecutive events may be either irrelevant or known given the states at all events. In some such embodiments, when a discrete event system is used to model a repairable system, the repairable system may be mathematically equivalent to a discrete event system.

In some embodiments, although a discrete event system arguably does not exist in real life, such a system can be a reliable and efficient approximation to many real-world systems. In various such embodiments, a reliable system may refer to a system that is equivalent to a discrete event system if the required conditions are satisfied. In some such embodiments, an efficient system may refer to a system that can simulate from a discrete event system without stepping into intervals between events, which saves time. One or more embodiments may utilize formalisms that have been introduced to specify discrete event systems, such as those described in Ziegler, B. P., 1976, *Theory of Modeling and Simulation*, Wiley. For instance, formalisms to specify discrete event systems known as discrete event system specification (DEVS) may be utilized. Various embodiments, may utilize discrete event system and/or discrete event simulation techniques, such as those described in Ziegler, B. P., H. Praehofer, and T. G. Kim, 2000, *Theory of Modeling and Simulation*. $2^{nd}$ ed. Academic Press and/or Cassandras, C. G. and S. Lafortune, 2009, *Introduction to Discrete Event Systems*, $2^{nd}$ ed. Springer. In one or more embodiments, a dynamic RBD approach or portions thereof that introduces state elements to RBD formalism may be used, such as those described by Distefano, S. and A. Puliafito, 2006, "System Modeling with Dynamic Reliability Block Diagrams", in Safety and Reliability for Managing Risk, edited by G. Soares and Zio, London: Taylor & Francis Group and/or Xu, H. and L. Xing, 2007, "Formal Semantics and Verification of Dynamic Reliability Block Diagrams for System Reliability Modeling", in *Proceedings of the $11^{th}$ LASTED International Conference Software Engineering and Applications*, Cambridge, Mass.

In one or more embodiments, interactive workspace 1202 may allow for greater flexibility in performing customization. In various embodiments, the maintenance arrangement may have few or no limitations on construction. For example, the possibilities may only be limited by available or creatable actions and events. In some embodiments, common maintenance actions may be included, such as corrective maintenance and preventative maintenance. In some such embodiments, common maintenance actions may be based on timing of a maintenance (i.e., when the maintenance needs to be done). In many embodiments, corrective maintenance may include maintenance that is conducted after a failure event and preventative maintenance may include scheduled maintenance. In one or more embodiments, any number of actions may be available and/or creatable in interactive workspace 1202. In some embodiments, maintenance actions may be classified in one or more categories, such as based on what is done to the component under maintenance. For example, the categories may include replace-with-new and minimal repair. Replace-with-new may mean replacing the component under maintenance with a brand-new component while minimal repair may mean the action do not affect the remaining life reliability function of the component such that the component is neither more likely or less likely to fail due to performance of the action. Sometimes, minimal repair may be referred to as as-bad-as-old.

In various embodiments described herein, actions may include any action associated with installation, operation, or repair of one or more components in a repairable system. In some embodiments, actions may be decomposed into sub-actions in various implementations as additional built-ins. For instance, a replace-with-new maintenance may be available, which can be equivalent to four sub-actions: turn-off, install-new, turn-on, and turn-on system. In one or more embodiments, users may modify common actions by mix-and-matching sub-actions from different common actions and/or arrange them for different components in an arbitrary order. In various embodiments, the customizations described herein may be extremely useful for grouped maintenance of arbitrary types. Further, with the decompositions, many embodiments may expand the set of possible actions available. In one or more embodiments, event-action sub-diagrams may be created. In one or more such embodiments, an event may be associated with one or more actions and/or sub-actions. In some embodiments, implementations may evolve and/or may be extended. For instance, spare part tools and repair crews may be included. In some such embodiments, these evolutions and/or extensions may be introduced and implemented without disturbing existing design methodologies.

Figure 13A:
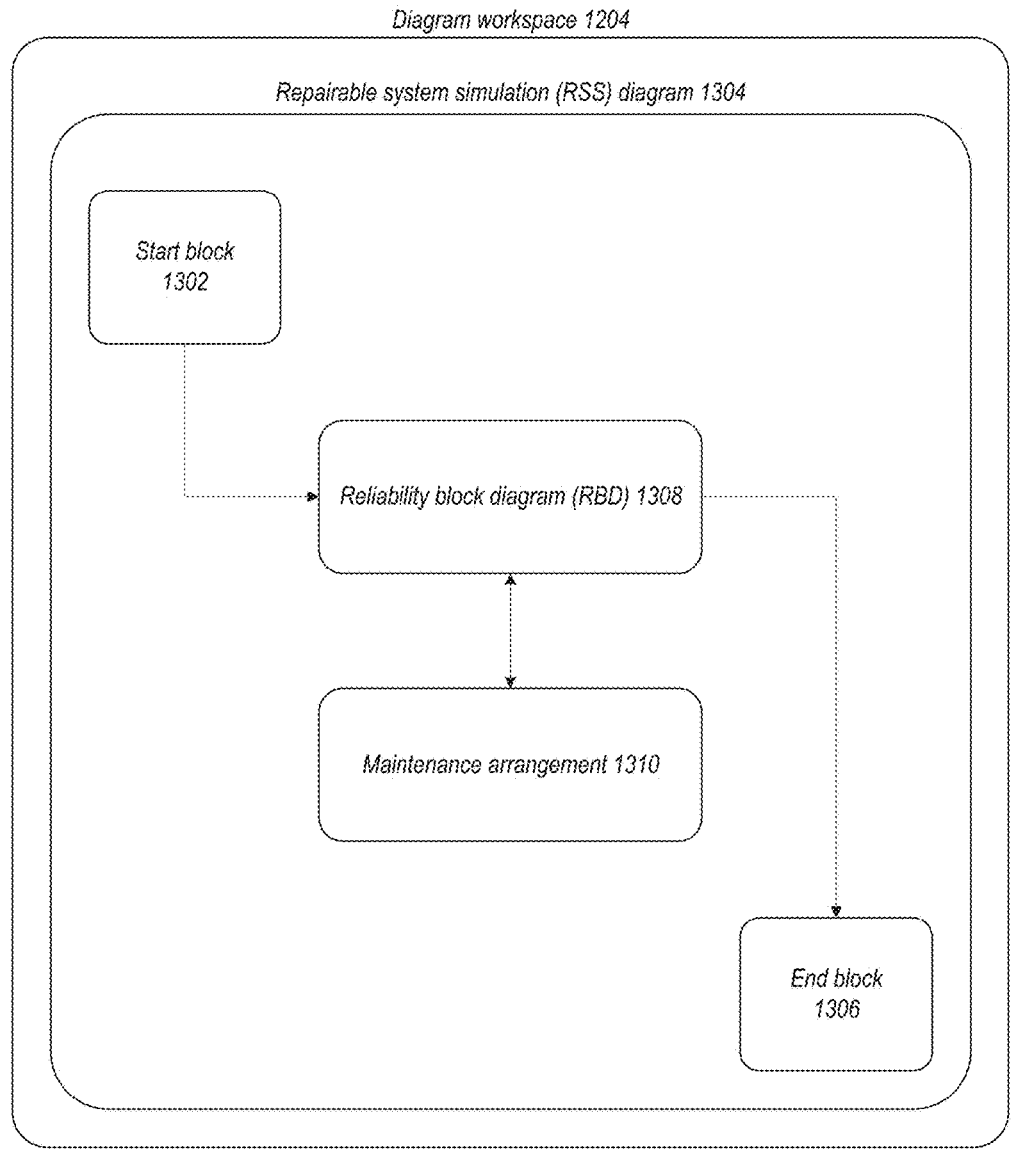
FIGS. 13A-13B illustrate block diagrams of exemplary diagram workspaces in an interactive workspace, according to some embodiments of the present technology.
Figure 13B:
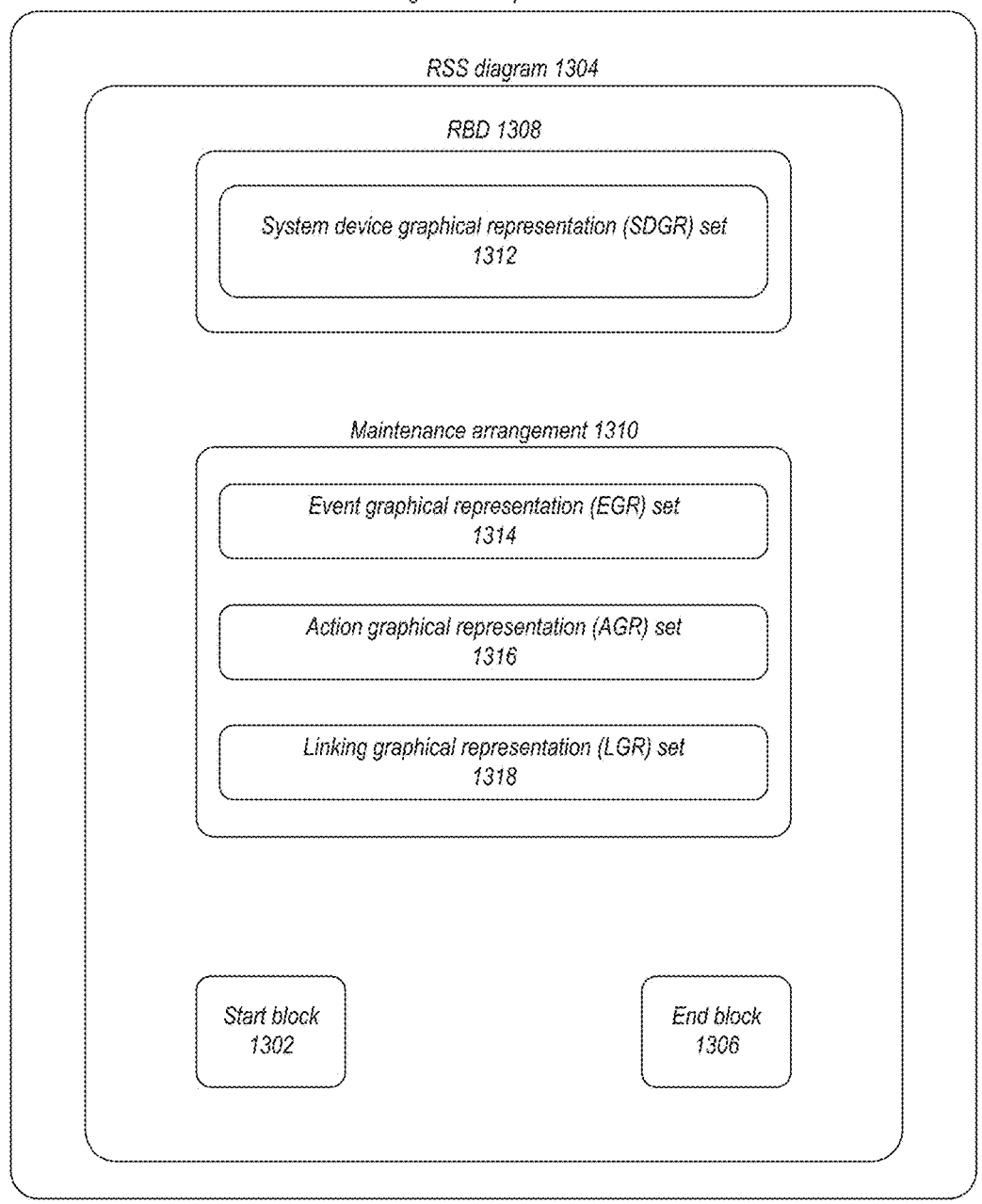

FIGS. 13A-13B illustrate block diagrams of an example of a diagram workspace 1204 that may be representative of various embodiments. In various embodiments, diagram workspace 1204 may include a repairable system simulation (RSS) diagram 1304. Referring to FIG. 13A, the RSS diagram 1304 may include a start block 1302, a reliability block diagram (RBD) 1308, one or more maintenance arrangement(s) 1310, and an end block 1306. As shown in FIG. 13B, RBD 1308 may comprise a system device graphical representation (SDGR) set 1312 and maintenance arrangement(s) 1310, which may include event graphical representation (EGR) set 1314, action graphical representation (AGR) set 1316, and linking graphical representation (LGR) set 1318. In various embodiments, each SDGR in SDGR set 1312 may represent or correspond to a device or component in the repairable system represented by RBD 1308 (i.e., an RSD). In various such embodiments, an EGR in EGR set 1314 may represent or correspond to an event that may occur with respect to one or more SDGRs in SDGR set 1312. In some embodiments, each AGR in AGR set 1316 may represent or correspond to an action that may be performed to at least partially resolve an event, and each LGR in LGR set 1318 may connect a respective AGR to one or more EGRs to indicate which event performance of the AGR can at least partially resolve. In some such embodiments, the respective AGR may be connected to one or more EGRs via one or more other AGRs, one or more other LGRs, and/or one or more other EGRs. Embodiments are not limited in this context.

In various embodiments, RSS diagram 1304 may involve structural dependences in RBD 1308 and event-action dependences in maintenance arrangements. In various such embodiments, implementation or simulation may involve computation based on the graphical representations. For instance, an LGR may have an upstream connection and a downstream connection. In such instances, any EGR or AGR connected to the downstream connection may only occur or be simulated after the EGR or AGR connected to the upstream connection. In some embodiments, one or more actions represented in AGR set 1316 may have a non-zero duration. In some such embodiments, while the action is active (e.g., during simulation), it may occupy resources. For example, a replace-by-new action may occupy an associated component block, represented by an SDGR in set 1312. In such examples, during the occupation, other actions may not be able to acquire the resource. In some embodiments, actions may be arranged in diagram workspace 1204 in parallel or in series. In one or more embodiments, various design considerations may be evaluated. In one or more such embodiments, the considerations may be related to a multitude of computer science subjects, such as scheduling, processing, networking, resource sharing, multithreading, and so on. In some embodiments, the RSS may be represented by dependent graphs, events, and actions such that existing techniques may be applied, such as those described above.

Referring back to FIG. 13A, in some embodiments, the start and end blocks 1302, 1306 may correspond to elements to mathematically represent a repairable system using Graph Theory. In such embodiments, if a path exists from start to end, a repairable system may be considered reliable. For instance, a maintenance arrangement may be associated with a repairable system that includes a two-engine airplane represented in an RBD, including an SDGR set 1312 with an SDGR for each of a cockpit, a control system, two wings, two engines, and a tail. In such instances, the SDGRs may be arranged in series between start block 1302 and end block 1306; therefore, the airplane may be considered reliable as long as a path exists therebetween.

Referring again to FIG. 13B, various graphical representations may be added to one of the graphical representations sets in diagram workspace 1204 (e.g., SDGR set 1312, EGR set 1314, AGR set 1316) by selecting an icon in a menu (e.g., event menu 1206, action menu 1208, system device menu 1210). In some embodiment selection of an icon in a menu may be performed with a drag-and-drop operation. For instance, an icon from action menu 1208 may be dragged and dropped into diagram workspace 1204 in order to add an AGR into diagram workspace 1204. In some embodiments, graphical representations may be added to one of the graphical representation sets in diagram workspace 1204 (e.g., LGR set 1318) by creating an association or connection between two existing graphical representations in the diagram workspace 1204. For example, by associating an AGR with an EGR an LGR may be produced in diagram workspace 1204 that connects the AGR to the EGR.

In various embodiments, an arbitrary number of AGRs may be associated with an SDGR, such as via one or more LGRs and/or other AGRs. In some embodiments, the EGRs may be associated with one or more of maintenance and non-maintenance events. In some such embodiments, non-maintenance events may include testing or duty cycle changes. For instance, events may include corrective maintenance, preventative maintenance, flood, fire, vandalism, component failure, or the like. In various embodiments, maintenance events may include scheduled or manufacturer recommended services. In one or more embodiments, each EGR may be associated with an arbitrary number of AGRs in any order/dependence. In some embodiments, one or more portions of the maintenance arrangement 1310 may be dynamically presented. For instance, one or more SDGR, LGR, AGR, or EGR may disappear and reappear within RSS diagram 1304 based on user input or preferences, such as cursor or eye position or the selected layer.

Figure 14A:
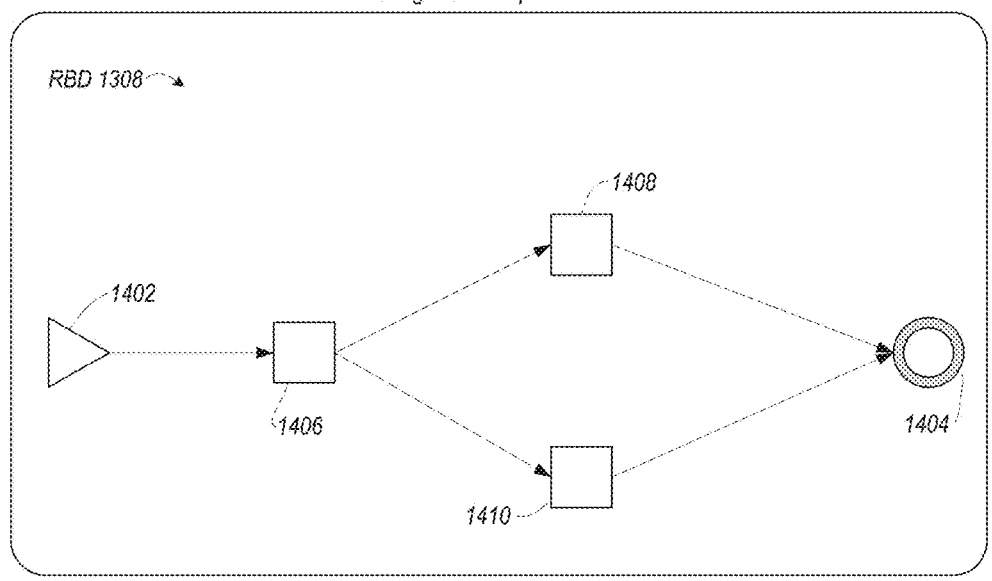
FIGS. 14A-14B illustrate exemplary embodiments of a diagram workspace, according to some embodiments of the present technology.
Figure 14B:
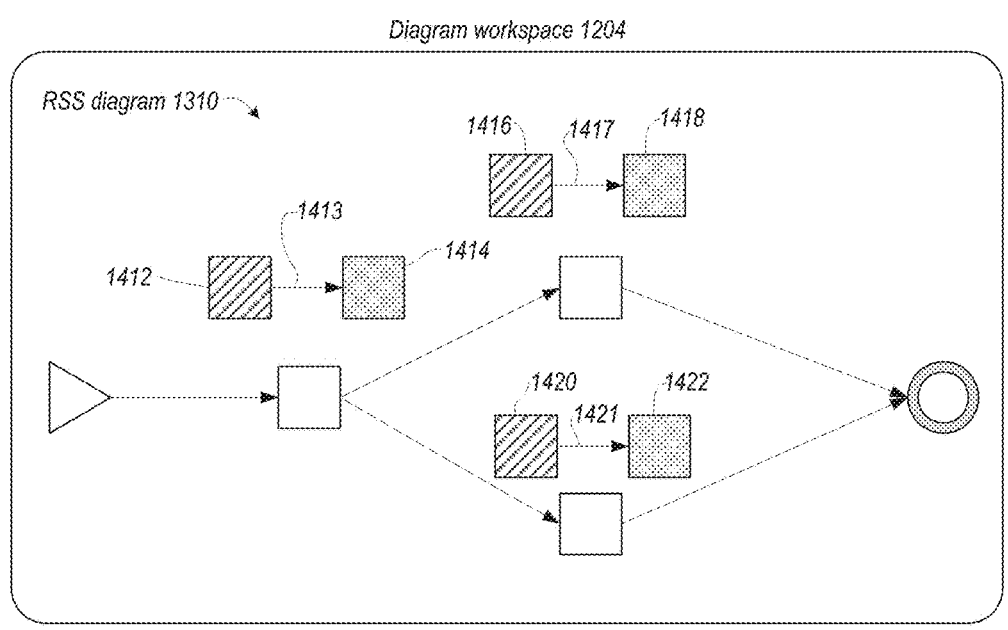

FIGS. 14A-14B illustrate example embodiments of diagram workspace 1204 that may be representative of various embodiments. In FIG. 14A, diagram workspace 1204 may include RBD 1308 with start block 1402, end block 1404, and SDGR set 1312 that includes SDGRs 1406, 1408, 1410. In FIG. 14B, diagram workspace 1204 may include RSS diagram 1310. In the illustrated embodiment, RSS diagram 1310 may include RBD 1308 plus a maintenance arrangement that includes EGRs 1412, 1416, 1420, AGRs 1414, 1418, 1422, and LGRs 1413, 1417, 1421. Thus, EGR set 1314 may include EGRs 1412, 1416, 1420, AGR set 1316 may include AGRs 1414, 1418, 1422, and LGR set 1318 may include LGRs 1413, 1417, 1421. Embodiments are not limited in this context.

Referring to FIG. 14A, there may be three SDGRs that correspond to components or devices in a repairable system. In various embodiments, each SDGR may be specified by individual reliability functions. In one or more embodiments described herein, a system may be considered reliable or available if there is a path between start block 1402 and end block 1404. In one or more such embodiments, if any of the SDGRs fail, the failed SDGR will be removed from the diagram, along with the arrows connected to it. It follows, if SDGR 1406 fails, the system fails; however, if only SDGR 1408 fails, the system is still reliable. In various embodiments, the various graphical representations may be arranged in parallel and/or series such that one or more paths may exists between the start and end blocks.

Referring now to FIG. 14B, in some embodiments, a maintenance arrangement may be added to the RBD, such as to address the frequency and type of maintenance potentially applied to the system. As previously mentioned, to accomplish this the EGRs, AGRs, and LGRs may be added to diagram workspace 1204. In some embodiments, they all may be tied to one or more SDGRs in an RBD. The RSS diagram 1310 may describe the maintenance arrangement of the system, which is to replace an SDGR with a new one upon failure. In various embodiments, the EGRs and AGRs may be attached to SDGRs. In various such embodiments, this may emphasize events that originate from the attached SDGRs, and AGRs that are applied to the SDGR in response to occurrence of the EGR.

For illustrative purposes, the embodiments described with respect to FIGS. 14A-14B may be relatively simple when compared to other embodiments. However, embodiments can be more complex (see e.g., FIGS. 15A-15B). For example, multiple LGRs could connect each EGR to all the AGRs. In such examples, the new maintenance arrangement would replace every component (represented by SDGRs) whenever a component fails. In another example, more than one event node (i.e., EGR) may be stacked on individual component blocks (i.e., SDGRs). In some embodiments, not all EGRs may represent SDGR failure events. In some such embodiments, there may be system failure events, which may be global events. Whenever a global event occurs, the event may be broadcasted to all repairable system components (i.e., SDGRs). In another example, events may include time based scheduled maintenance events.

Further, in various embodiments, more than one action node (i.e., AGR) may be added. For instance, each AGR may represent a different maintenance task. In some embodiments, multiple EGRs may point to one AGR, and/or one EGR may point to multiple AGRs. In some such embodiments, an AGRs and EGRs may 'point' to each other using LGRs. In one or more embodiments, the diagrammatic linkages (i.e., LGRs) between event and action elements (i.e., EGRs and AGRs) may provide advantageous and unparalleled ways to present maintenance arrangements. Moreover, multiple AGRs may be chained together to represent a series of actions, or to compose a complex maintenance task, such as using available built-in actions. In various embodiments, each AGR may represent a different maintenance task. In one or more embodiments, these and other features described herein may allow maintenance arrangements that are completely arbitrary based on the needs of a user.

Figure 15A:
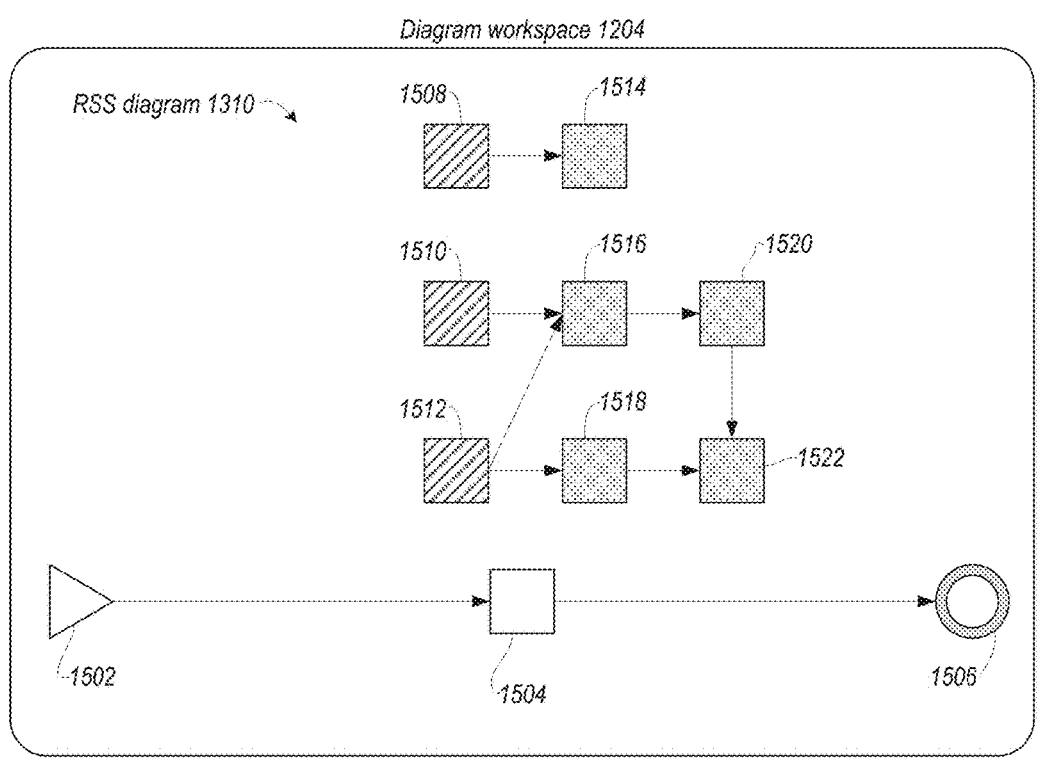
FIGS. 15A-15B illustrate exemplary embodiments of a diagram workspace, according to some embodiments of the present technology.
Figure 15B:
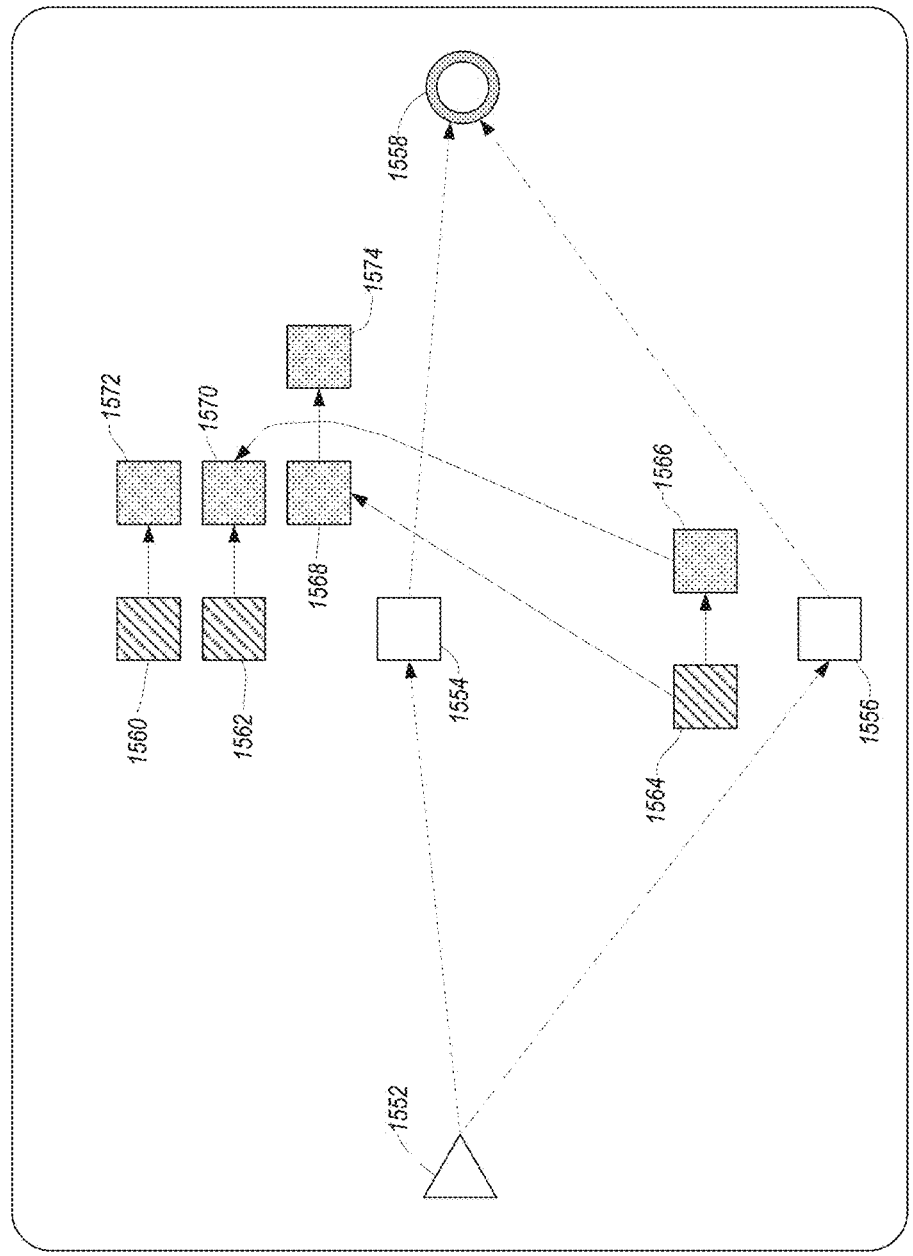

FIGS. 15A-15B illustrates example embodiments of a diagram workspace 1204 of interactive workspace 1202 that may be representative of various embodiments. The embodiment illustrated in FIG. 15A may represent a seasonal stress example of a maintenance arrangement. In this embodiment, diagram workspace 1204 may include start block 1502, SDGR 1504, end block 1506, EGRs 1508, 1510, 1512, AGRs 1514, 1516, 1518, 1520, 1522, and LGRs connecting different EGRs and AGRs (arrows illustrated but not numbered for clarity). The embodiment illustrated in FIG. 15B may represent a dedicated standby example of a maintenance arrangement. In this embodiment, diagram workspace 1204 may include start block 1554, SDGRs 1554, 1556, end block 1558, EGRs 1560, 1562, 1564, AGRs 1566, 1568, 1570, 1572, 1574, and LGRs connecting different EGRs and AGRs (arrows illustrated but not numbered for clarity). Embodiments are not limited in this context.

Referring specifically to FIG. 15A, in various embodiments, SDGR 1504 may represent a power generator in a repairable system that runs six months on lower stress, then six months on higher stress, and then repeats this cycle. This may be a common scenario for electrical power generation that supplies electricity to residential areas. For instance, during the summer time, consumption is high due to running air conditioning units and during the winter time, consumption is low due to the fact that heat sources may use alternative energy forms, such as gas or oil. In various such embodiments, EGR 1508 may correspond to a failure of the generator, EGR 1510 may correspond to initialization of the generator, and EGR 1512 may correspond to a 12-month generator adjustments. Additionally, AGR 1514 may correspond to replacing the generator with a new generator, AGR 1516 may correspond to scheduling a generator adjustment in six months, AGR 1520 may correspond to adjusting the generator for higher stress, AGR 1518 may correspond to adjusting the generator for lower stress, and AGR 1522 may correspond to running the generator.

Accordingly, the configuration of the RSS diagram 1310 shown in FIG. 15 may include the following steps: (1) The initial state of the generator is adjusted for lower stress; (2) at the beginning (EGR 1510), schedule an adjustment at six months later (AGR 1516) to adjust the generator for higher stress (AGR 1520) and run the generator (AGR 1522); (3) for every 12 months (EGR 1512), adjust the generator for lower stress (AGR 1518), schedule an adjustment at six months later (AGR 1516) to adjust the generator for higher stress (AGR 1520) and run the generator (AGR 1522); and (4) whenever the generator fails (EGR 1508), replace it with a new component (AGR 1514). Further, the adjustment actions (AGR 1518, 1520) are sub-actions. As such, they can implicitly turn off the system if the system is not already off. This may mimic the safety concern in the real world. They, however, may not implicitly turn on the generator after the actions are completed. Thus, in order to allows a user to decide when to turn the generator on, AGR 1522 may be used to explicitly turn the generator on.

Referring specifically to FIG. 15B, in various embodiments, SDGR 1556 may represent a main power generator and SDGR 1554 may represent a standby generator in a repairable system. This may represent a cold standby design. Standby designs may include cold, warm, and hot standby designs. A cold standby design may prepare redundancy units at an inactive state, and activates them when they are needed. A warm standby design is similar, except the redundancy units are active at a lower stressed condition when they are standing by. A hot standby may refer to a standby unit that is active at regular stress all the time.

The embodiment illustrated in FIG. 15B may be a simplified power generation system, with one main generator (SDGR 1556) and one standby generator (SDGR 1558). In various embodiments, the two generators may be physically identical when they are new. Further, the main generator may be designed to run at full capacity all the time, and whenever it fails (EGR 1564), it is replaced with a new generator (AGR 1556). However, replacing the main generator takes time, so upon failure of the main generator (EGR 1564), the standby generator will also be turned on (AGR 1568) and then the repairable system will be turned on (AGR 1574). In some embodiments, AGR 1574 may be needed to inform the logic that the system is on. In some such embodiments, this may enable associated statistics to be collected. When the main generator replacement (AGR 1566) is done, the standby generator may be turned off (AGR 1570). Additionally, the maintenance arrangement of FIG. 15B has other configurations. For instance, at system initialization (EGR 1562), the standby generator may be turned off (AGR 1570). In another instance, when the standby generator fails (EGR 1560), it may be replaced (AGR 1572). It will be appreciated that the embodiments described with respect to FIGS. 15A-15B are only illustrative, and additional and/or different embodiments can be realized without departing from the scope of this disclosure.

Figure 16A:
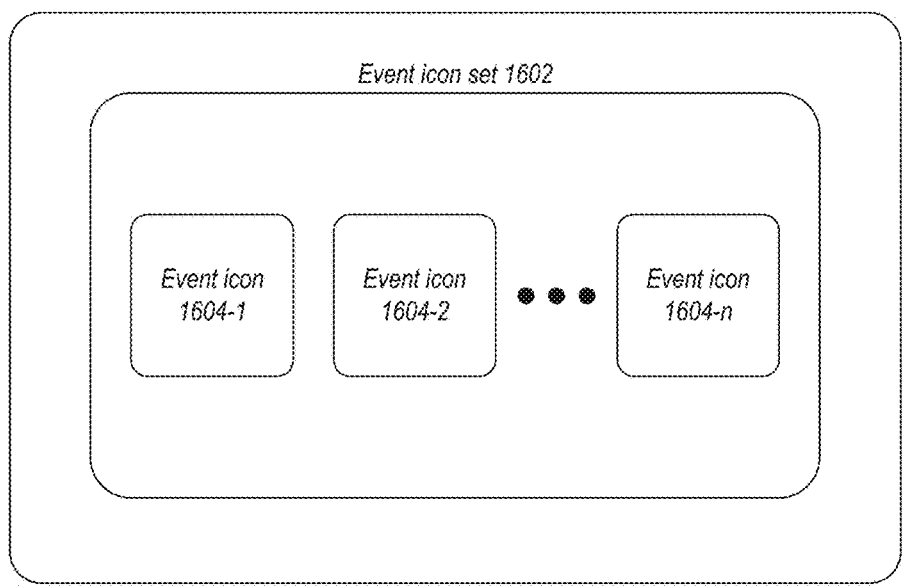
Figure 16B:
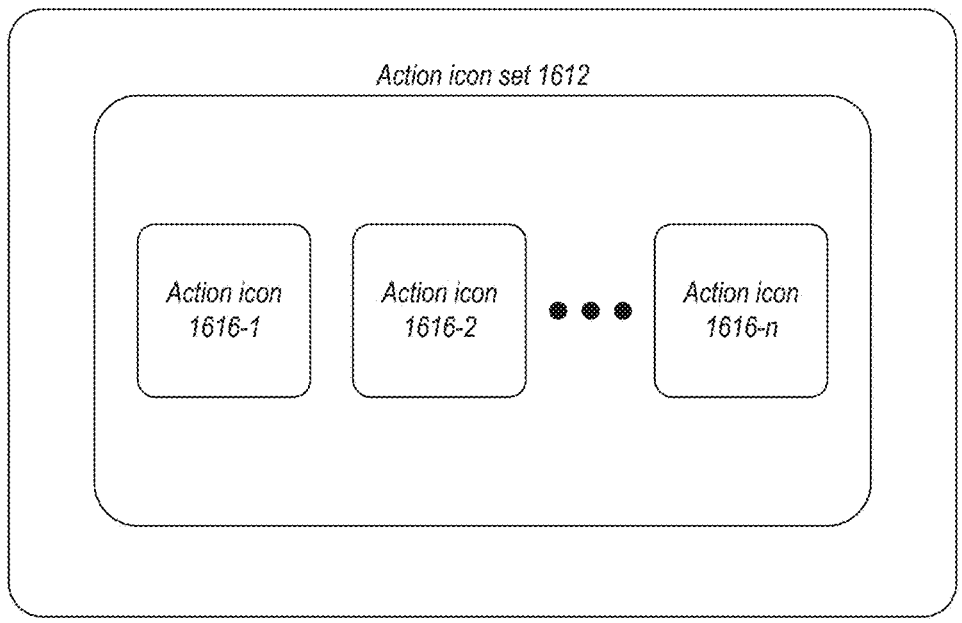
Figure 16D:
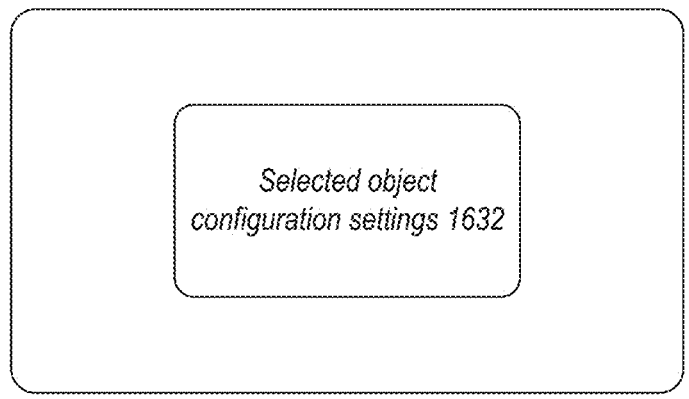

FIGS. 16A-16D illustrate block diagrams of example menus in an interactive workspace. In one or more embodiments described herein, these menus may be used to add, manipulate, and/or configure elements in an RSS diagram, such as SDGRs, EGRs, AGRs, and LGRs. FIG. 16A may include event menu 1205 with event icon set 1602 that includes event icons 1604-1, 1604-2, 1604-*n*. FIG. 16B may include action menu 1208 with action icon set 1612 that includes action icons 1616-1, 1616-2, 1616-*n*. FIG. 16C may include system device menu 1210 with system device icon set 1622 that includes system device icons 1624-1, 1624-2, 1624-*n*. FIG. 16D may include configuration menu 1212 with selected object configuration settings 1632. Embodiments are not limited in this context.

In various embodiments, the various menus may be presented in interactive workspace 1202 in conjunction with diagram workspace 1204. In various such embodiments, the different menus and workspaces in interactive workspace 1202 may appear as configurable windows. In some embodiments, one or more components of interactive workspace 1202 (e.g., event menu 1206, action menu 1208, system device menu 1210, and configuration menu 1212) may appear in the same window with one or more other components appearing in one or more other windows presented simultaneously with the first window (e.g., the diagram workspace 1204 appearing in another window). In other embodiments, one or more components of interactive workspace 1202 may appear in a portion of a window as a set of one or more panels. For instance, in FIG. 17, interactive workspace 1202 may include a single window and system device menu 1210, diagram workspace 1204, event menu 1206, action menu 1208, and configuration menu 1212 may be panels in the single window.

In one or more embodiments, interactive workspace may be configured in any desired manner to display one or more of diagram workspace 1204, event menu 1206, action menu 1208, system device menu 1210, and configuration menu 1212 in any proportions.

In some embodiments, event menu 1206 (FIG. 16A) may include one or more events that may be added to diagram workspace 1204 as EGRs. In some such embodiments, one or more available event may be represented as separate event icons. In various embodiments, the one or more event icons 1604-1, 1604-2, 1604-*n* in event icon set 1602 may be dynamically populated based on one or more of settings, preferences, historical interactions, machine learning, and/or a current selection. In various embodiments, action menu 1208 (FIG. 16B) may include one or more actions that may be added to diagram workspace 1204 as AGRs. In various such embodiments, one or more available actions may be represented as separate action icons. In some embodiments, the one or more action icons 1616-1, 1616-2, 1616-*n* in action icon set 1612 may be dynamically populated based on one or more of settings, preferences, historical interactions, machine learning, and/or a current selection. In one or more embodiments, system device menu 1210 (FIG. 16C) may include one or more repairable system devices, or arrangements thereof, that may be added to diagram workspace 1204 as SDGRs. In various such embodiments, one or more available devices may be represented as separate system device icons. In some embodiments, the one or more system device icons 1624-1, 1624-2, 1624-*n* in system device icon set 1622 may be populated based on one or more of settings, preferences, historical interactions, machine learning, and/or a current selection. In various embodiments, EGRs, AGRs, and/or SDGRs may be added to diagram workspace 1204 in response to dragging and dropping an associated icon from an associated menu into the diagram workspace 1204.

In one or more embodiments, configuration menu 1212 (FIG. 16D) may provide one or more settings for a selected SDGR that may be adjusted. In various embodiments, configuration menu 1212 may populate the selected object configuration settings 1632 based on which graphical representation is currently selected. For instance, a duration of or the resources occupied during performance of an action may be adjusted. In one or more embodiments, other options may be presented to a user in response to selection of a graphical representation, such as an option in diagram workspace 1204 to create an association with an LGR (see e.g., FIGS. 17-19B). In some embodiments, configuration menu 1212 may enable a user to access and/or adjust settings associated with any graphical representation in diagram workspace 1204 by simply clicking on the graphical representation. In some such embodiments, when a graphical representation is selected, one or more selected object configuration settings 1632 may be provided in configuration menu 1212. In one or more embodiments, selection of a graphical representation in diagram workspace 1204 may cause configuration menu 1212 to be displayed within interactive workspace 1202. Example embodiments of the various menus, icons, and settings are provided, such as with respect to FIGS. 17-18.

Figure 17:
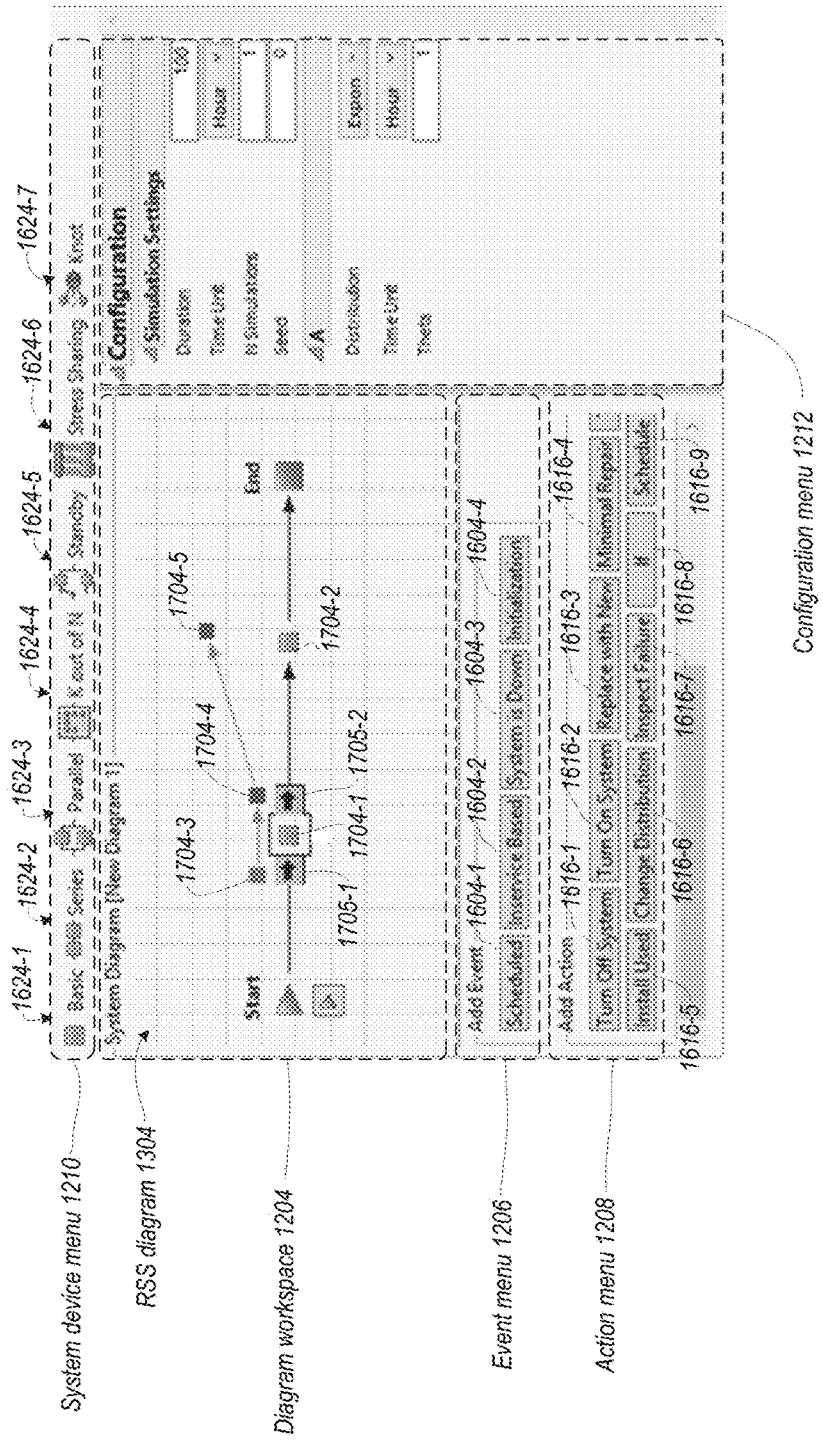
FIG. 17 illustrates an exemplary embodiment of an interactive workspace, according to some embodiments of the present technology.

FIG. 17 illustrates an example of an embodiment of interactive workspace 1202 that may be representative of various embodiments. As previously mentioned, interactive workspace 1202 may be designed to assist users in construction maintenance arrangements and/or RBDs in a convenient, logical, and intuitive manner. In some embodiments, there are RBD blocks (i.e., SDGRs), event nodes (i.e., EGRs), and action nodes (i.e., AGRs). In some such embodiments, the connections among RBD blocks may prescribe dependencies (e.g., dependence between SDGR 1704-1 and SDGR 1704-2). Further, connections between EGRs and AGRs may prescribe a triggering mechanism between events and actions. Moreover, connections between pairs of actions nodes may be used to arrange execution orders of actions. In various embodiments, the arrangement and connections between blocks may be determined manually. However, in some embodiments, the arrangement and connections between blocks may be, at least partially, determined automatically. For example, the layout of various components may be automatically adjusted to achieve one or more aesthetic objectives. In another example, suggested arrangements and/or connections may be automatically presented for manual selection, such as using historical interactions or machine learning algorithms Embodiments are not limited in this context.

In one or more embodiments, FIG. 17 may illustrate an example of the entire GUI of interactive workspace 1202. In some embodiments, the origination of an RSS diagram may begin with the addition of SDGRs to create RBD 1308. In some such embodiments, the available SDGRs may be provided in system device menu 1210, at the top of interactive workspace 1202. In the illustrated embodiment, the available SDGRs include basic block 1624-1, series block 1624-2, parallel block 1624-3, K out of N block 1624-4, standby block 1624-5, stress sharing block 1624-6, and knot block 1624-7. In one or more embodiments, an SDGR may be added to diagram workspace 1204 by dragging if from the system device menu 1210 and dropping it in diagram workspace 1204.

In various embodiments, basic block 1624-1 may represent a component whose reliability can be prescribed by a single function. In some embodiments, series block 1624-2 may represent a sub-system which includes of a series of N identical components whose reliabilities can be represented by the same single function. In some such embodiments, if any component of the sub-system fails, the sub-system will fail. In one or more embodiments, the reliability function of the sub-system may be a function of the individual functions. In many embodiments, parallel block 1624-3 may be similar to series block 1624-2, except the components in this sub-system are in parallel. Therefore, only if all the components fail will the sub-system will fail.

In various embodiments, K out of N block 1624-4 may be similar to parallel block 1624-3, except at least K components may be required to be functioning to assure functioning of the sub-system. In other words, if (N−K+1) components fail, the sub-system will fail. In some embodiments, standby block 1624-5 may be similar to K out of N block 1624-4. However, in K out of N block 1624-4, all of its components may be running at the same stress, so their reliability functions are identical; but in standby block 1624-5, only N components are running at full stress, and the remaining ones can be in cold standby (inactive) or warm standby (active but lower stress, therefore is associated with a different reliability function). Thus, whenever an active component in N fails, a standby component may be asked to run under the full stress, and therefore, its reliability function changes at the moment when it is activated. Further, the sub-system will fail if it runs out of standby components to activate.

In one or more embodiments, stress sharing block 1624-6 may be similar to parallel block 1624-3, except whenever a component fails, the stress on the sub-system is evenly redistributed among all remaining components, thus the reliability functions of all remaining components will change. In one or more such embodiments, the sub-system will fail if all components fail. In various embodiments, knot block 1624-7 may not be associated with any physical component or sub-system. In various such embodiments, knot block 1624-7 may be a mathematical/logical operator. Recall that all components in the above blocks (except the Basic—because there is just one component, and the Standby blocks) may all be identical. Thus, knot block 1624-7 may be a tool to create similar sub-system structures with individual components that may be different and have different reliability functions. In one or more embodiments, knot block 1624-7 may be analogized to AND/OR gates in a circuit board or an electrical engineering context.

In some embodiments, when an SDGR is selected (SDGR 1704-1 in FIG. 17), event menu 1206 and action menu 1208 may appear and/or be populated. In some such embodiments, event menu 1206 and action menu 1208 may provide available events and actions specific to the selected SDGR as icons. In the illustrated embodiment, event menu 1206 may include scheduled event 1604-1, in-service based event 1604-2, system is down event 1604-3, and initialization event 1604-4. Further, action menu 1208 may include turn off system action 1616-1, turn on system action 1616-2, replace with new action 1616-3, minimal repair action 1616-4, install used action 1616-5, change distribution action 1616-6, inspect failure action 1616-7, if action 1616-8, schedule action 1616-9, and additional actions that may be viewed or accessed by sliding the bar below action menu 1208. In some embodiments, a user may select any of the options in event menu 1206 and/or action menu 1208 to add nodes (i.e., corresponding graphical representations) onto the top of the selected SDGR 1704-2. In some such embodiments, these may include EGR 1704-3 and AGRs 1704-4, 1704-5.

In various embodiments, arrow buttons 1205-1, 1205-2 may appear on either side of the selected SDGR 1704-2. In various such embodiments, the arrow buttons may be hints or shortcuts to enable a user to establish connections with other SDGR blocks. In some embodiments, the connections may be established via drag-and-drop of the desired arrow button 1205-1, 1205-2. For instance, the connection between SDGR 1704-1 and SDGR 1704-2 may have been created by dragging arrow buttons 1205-2 to SDGR 1704-2 and dropping it. In one or more embodiments, the arrow buttons only appear around a selected SDGR. Further, configuration menu 1212 may appear for the selected SDGR 1704-1. Thus, configuration menu 1212 may include various settings for SDGR 1704-1, such as those illustrated in FIG. 17. In one or more embodiments, the dynamic behavior of interactive workspace 1202 described herein keeps the interface relevant, up-to-date, and convenient at all times.

As previously mention, one or more menus and workspaces may include different types of interactions (e.g., drag-and-drop, point-and-click, etc.), such embodiments may include the same or a similar version of one or more of the following described in context of FIG. 17. In some embodiments, the building blocks of an RBD (e.g., 1624-1 through 1624-7) can be dragged and dropped in to the workspace 1204 and create an instance of the corresponding component type (e.g., 1704-1 and 1704-2). In various embodiments, the events 1604-1 through 1604-4, may be clickable/selectable, by which an instance (e.g., 1704-3) of the clicked event type will be created and stacked on the upper left corner of the selected component (e.g., 1704-1). In one or more embodiments, the actions 1616-1 through 1615-5 may be clickable/selectable, by which an instance (e.g., 1704-4) of the clicked/selected action type will be created and stacked on the upper right corner of the selected component (1704-1).

As previously mentioned, interactive workspace 1202 of FIG. 17 may include a single window with a separate panel for each of system device menu 1210. In some embodiments, system device menu 1210 and diagram workspace 1204 may be persistently displayed in interactive workspace 1202. In various embodiments, event menu 1206 and action menu 1208 may only be shown when a single component (e.g., 1704-1 or 1704-2) is selected in diagram workspace 1204. In one or more embodiments, the contents of the event menu 1206 (e.g., 1604-1 through 1604-4) and/or the contents of action menu 1208 may be decided based on the type of the selected component. In one or more such embodiments, the contents may also be decided based on one or more machine learning algorithms, such as neural networks. Additionally, in many embodiments, different types of components may have different contents in various menus. In many such embodiments, these contents may show if one and only one component of the requisite type is selected to avoid presenting contents in menus that may not be used with the selected component. In some embodiments, the configuration menu 1212 may be selectively toggled to hide or show completely. In various embodiments, the configuration menu 1212 may include simulation settings and settings for selected elements in diagram workspace 1204. In one or more embodiments, the simulation settings may always be presented in configuration menu 1212. In some embodiments, the other contents in configuration menu 1212 may be based on selected elements in diagram workspace 1204. In some such embodiments, this may enable the configuration menu 1212 to remain relevant and concise.

Figure 18:
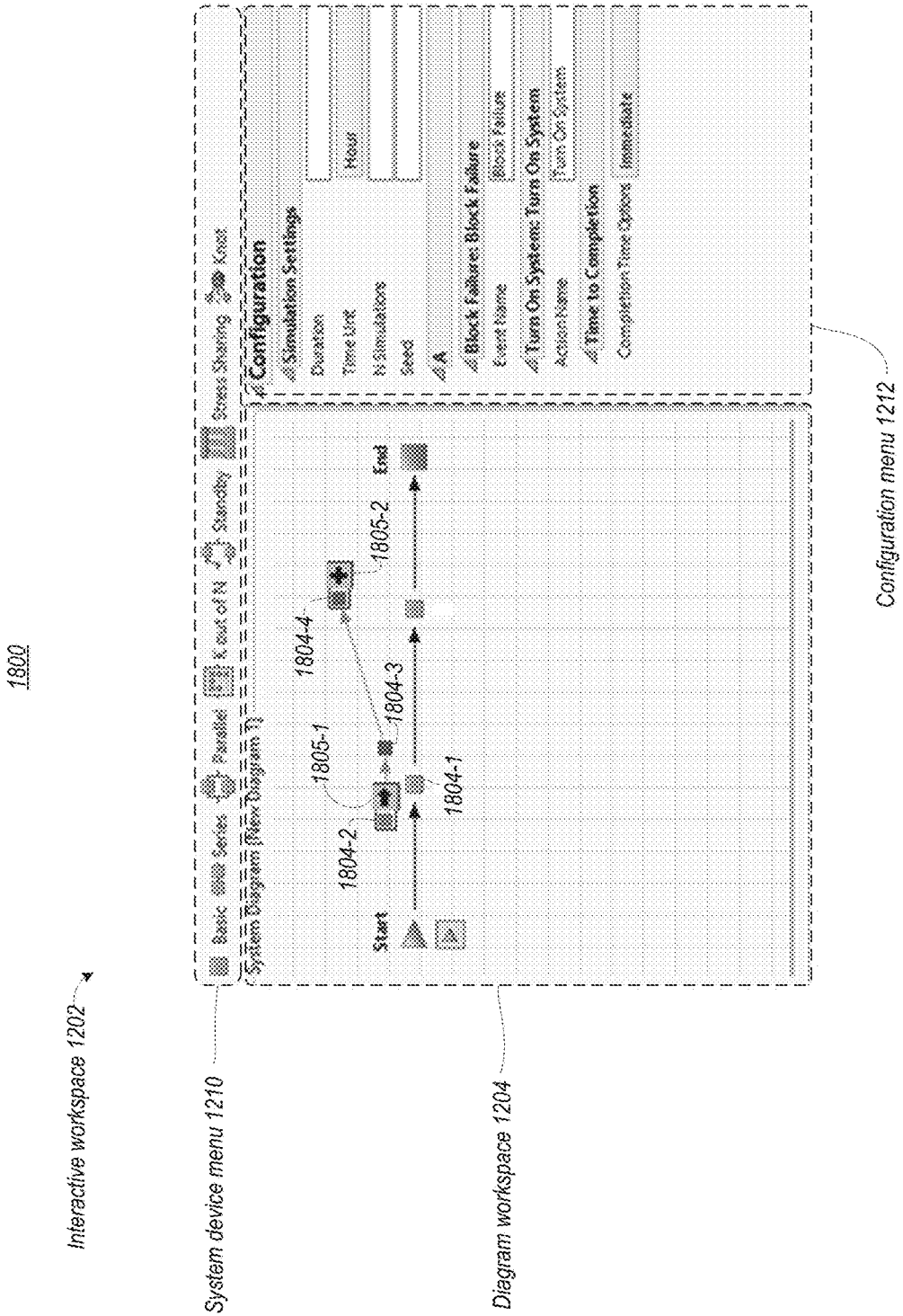
FIG. 18 illustrates an exemplary embodiment of an interactive workspace, according to some embodiments of the present technology.

FIG. 18 illustrates an example of an embodiment of interactive workspace 1202 that may be representative of various embodiments. As previously mentioned, interactive workspace 1202 may be designed to assist users in construction maintenance arrangements and/or RBDs in a convenient, logical, and intuitive manner. In some embodiments, there are RBD blocks (i.e., SDGRs), event nodes (i.e., EGRs), and action nodes (i.e., AGRs). In some such embodiments, the connections among SDGRs may prescribe dependencies. Further, connections between EGRs and AGRs may prescribe a triggering mechanism between events and actions. Moreover, connections between pairs of actions nodes may be used to arrange execution orders of actions. In various embodiments, the arrangement and connections between blocks are determined by a user. Embodiments are not limited in this context.

In one or more embodiments, FIG. 18 may illustrate interactions with event and actions nodes, such as EGR 1804-2 and AGRs 1804-3, 1804-4. After the creation of the RBD, which includes SDGR 1804-1, connections between one or more of events and actions may be made. For instance, arrow button 1805-1 may be used in a similar manner to arrow button 1705-1 to create connections between EGR 1804-2 and an AGR, such as AGR 1804-3. Further, in various embodiments, plus button 1805-2 may be used to create connections between AGR 1804-4 and another AGR. In various such embodiments, AGRs may be added and connected at the same time by dragging the plus hint button to the appropriate location, such as a desired action icon in the action menu (not shown). In some embodiments, connections between existing AGRs may be generate by dragging the plus button 1805-2 from one node (e.g., AGR 1804-4) and dropping it onto the desired node to connect. Further, configuration menu 1212 may appear for the selected nodes (EGR 1804-2 in FIG. 18). Thus, configuration menu 1212 may include various settings for EGR 1804-2 and one or more connected AGRs (e.g., AGRs 1804-3, 1804-4). In various embodiments, the dynamic behavior of interactive workspace 1202 described herein keeps the interface relevant and convenient at all times.

In some embodiments, additional actions may be created by dragging and dropping 1805-1. Upon dropping, a new action block will be created (e.g. 1804-3), and the linkage between the two actions is automatically formed to represent the ordering of the actions. Thus, in various embodiments described herein, the operations are designed that way, so the bound is automatically established between the events/actions and the RBD component that they are originated from and associated with. In many embodiments, this may prevent a mismatch among components, events, and actions may lead to a design error at user's end. Additionally, or alternatively, this may prevent or make previously difficult to identify errors readily identifiable.

FIG. 19 illustrates an embodiment of a logic flow 1900. The logic flow 1900 may be representative of some or all of the operations executed by one or more embodiments described herein. More specifically, the logic flow 1900 may illustrate operations performed by processing or logic circuitry used to implement interactive workspace 1202. In one or more embodiments, these operations may be performed in conjunction with designing, generating, and/or creating maintenance arrangements (e.g., maintenance arrangement 1310) for repairable systems in an interactive workspace, such as for simulation of maintenance events. Embodiments are not limited in this context.

In the illustrated embodiment shown in FIG. 19, the logic flow 1900 may begin at block 1902. At block 1902, an interactive workspace may be presented, the interactive workspace to include an event menu, an action menu, and a diagram workspace with a reliability block diagram (RBD) and a maintenance arrangement, the RBD to include a system device graphical representation (SDGR) associated with a repairable system device (RSD) and the maintenance arrangement to include one or more event graphical representations (EGRs) and one or more action graphical representations (AGRs) associated with the RSD, the event menu to include a set of event icons, each event icon in the set of event icons associated with an event to resolve, and the action menu to include a set of action icons, each action icon in the set of action icons associated with a task in a set of tasks that correspond to the RSD, wherein a resolution of the event includes a performance of one or more tasks in the set of tasks that correspond to the RSD. For instance, interactive workspace 1202 may be presented with diagram workspace 1204, event menu 1206, and action menu 1208. In such instances, the diagram workspace 1204 may include RBD 1308 and maintenance arrangement 1310. In such instances, RBD 1308 may include SDGR 1406, the event menu 1206 may include event icon set 1602, and the action menu 1208 may include action icon set 1612.

Continuing to block 1904, a selected event icon of the set of event icons in the event menu may be identified. For instance, event icon 1604-1 of event icon set 1602 in event menu 1206 may be identified as the selected event icon. Proceeding to block 1906, a EGR associated with the selected event icon may be generated in the maintenance arrangement of the diagram workspace in response to identification of the selected event icon. For instance, EGR 1412 may be generated in diagram workspace 1204 of FIG. 14B may be generated in response to identification of event icon 1604-1 of event icon set 1602 as the selected event icon. In various embodiments, EGR 1412 may be associated with SDGR 1406. In some embodiments, the selected event icon may be identified based on a drag-and-drop operation.

At block 1908, a selected action icon of the set action icons in the action menu may be identified. For instance, action icon 1616-1 of action icon set 1612 in action menu 1208 may be identified as the selected action icon. Continuing to block 1910, an AGR associated with the selected action icon may be generated in the maintenance arrangement of the diagram workspace in response to identification of the selected action icon. For instance, AGR 1414 may be generated in diagram workspace 1204 of FIG. 14B may be generated in response to identification of action icon 1616-1 of action icon set 1612 as the selected event icon. In some embodiments, the selected action icon may be identified based on a drag-and-drop operation.

Proceeding to block 1912, the EGR and the AGR may be graphically connected in the maintenance arrangement of the diagram workspace with a linking graphical representation (LGR) to indicate that a resolution of the event associated with the EGR depends on performance of a task associated with the AGR that correspond to the RSD. For instance, LGR 1413 may graphically connect EGR 1412 to AGR 1414. Continuing to block 1914, a simulation of one or more events associated with the EGR or the tasks associated with the AGR using a type of simulation for a reliability, availability, and maintainability (RAM) simulation. In one or more embodiments, the simulation may be performed based on one or more simulation settings in configuration menu 1212.

In various embodiments, processing and/or logic circuitry described herein (such as processing circuitry to implement interactive workspace 1202) may include any of a wide variety of commercially available processors. Further, one or more of these processors may include multiple processors, a multi-threaded processor, a multi-core processor (whether the multiple cores coexist on the same or separate dies), and/or a multi-processor architecture of some other variety by which multiple physically separate processors are linked. In some embodiments, the circuitry may be selected to efficiently perform the designing, generating, and/or creating maintenance arrangements (e.g., maintenance arrangement 1310). Alternatively, or additionally, the processors of one or more node devices may be selected to efficiently perform one or more operations described herein. In some embodiments, one or more operations described herein may be performed at least partially in parallel. By way of example, one or more processors may incorporate a single-instruction multiple-data (SIMD) architecture, may incorporate multiple processing pipelines, and/or may incorporate the ability to support multiple simultaneous threads of execution per processing pipeline.

In various embodiments, one or more portions of the processing or logic flows described herein, including the components of which each is composed, may be selected to be operative on whatever type of processor or processors that are selected to implement interactive workspace 1202. In various embodiments, each of these one or more portions of the processing or logic flows described herein may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processing or logic circuitry. Where one or more device drivers are included, those device drivers may provide support for any of a variety of other components, whether hardware or software components, described herein.

In various embodiments, interactive workspace 1202 may utilize or include storage and/or memory. In various such embodiments, the storage and/or memory may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR- DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid-state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller). However, in one or more embodiments, storage and/or memory of one or more of the node may be implemented with a redundant array of independent discs (RAID) of a RAID level selected to provide fault tolerance to prevent loss of one or more of these datasets and/or to provide increased speed in accessing one or more of these datasets.

In various embodiments, one or more of the interfaces described herein (e.g., diagram workspace 1204, event menu 1206, action menu 1208, system device menu 1210, configuration menu 1212) may each utilize or include any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions. Various embodiments may include or utilize one or more displays to present information. In various such embodiments, each of the displays may each be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, one or more of the interfaces may be a touchscreen display.

Some embodiments may include one or more network interfaces that employ any of a wide variety of communications technologies enabling these devices to be coupled to one or more other devices. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution. For Data and Voice (EV-DV), High Speed Downlink Packet Access (HSDPA), High Speed Uplink Packet Access (HSUPA), 4G LTE, etc. However, in a specific embodiment, a network interface may be implemented with multiple copper-based or fiber-optic based network interface ports to provide redundant and/or parallel pathways in exchanging data.

In various embodiments, the processing, memory, and/or storage resources of interactive workspace 1202 may be divided among the multiple systems. In various such embodiments, one or more API architectures may support communications among the multiple systems. The one or more API architectures may be configured to and/or selected to conform to any of a variety of standards for distributed processing, including without limitation, IEEE P2413, AllJoyn, IoTivity, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes. However, it should be noted that the parallelization of storage, retrieval and/or processing of data among multiple systems is not dependent on, nor constrained by, existing API architectures and/or supporting communications protocols. More broadly, there is nothing in the manner in which the data may be organized in storage, transmission, and/or distribution via network interface that is bound to existing API architectures or protocols.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

The invention claimed is:

1. A system comprising a processor and a storage to store instructions that, when executed by the processor, cause the processor to perform operations comprising:
   present an interactive workspace, the interactive workspace to include an event menu, an action menu, and a diagram workspace, the diagram workspace comprising a first layer and a second layer, the first layer to include a reliability block diagram (RBD) with one or more system device graphical representations (SDGRs) that each represent a repairable system device (RSD) in a repairable system and the second layer to include a maintenance arrangement with one or more event graphical representations (EGRs) and one or more action graphical representations (AGRs), wherein each of the one or more EGRs of the maintenance arrangement in the second layer represent a respective event that affects at least one RSD represented by an SDGR of the RBD in the first layer and at least one of the one or more AGRs of the maintenance arrangement in the second layer represent an action that resolves, at least in part, the respective event that affects the at least one RSD represented by the SDGR of the RBD in the first layer, the RBD in the first layer of the diagram workspace to include a first SDGR and a second SDGR, the first SDGR to represent a first RSD in the repairable system and the second SDGR to represent a second RSD in the repairable system, wherein the first SDGR of the RBD in the first layer is associated with a first reliability function that includes a first factor corresponding to stress applied to the first RSD and the second SDGR of the RBD in the first layer is associated with a second reliability function that includes a second factor corresponding to stress applied to the second RSD, the event menu to include a set of event icons, each event icon in the set of event icons associated with at least one event to resolve, and the action menu to include a set of action icons, each action icon in the set of action icons associated with at least one task in a set of tasks that correspond to the first RSD or the second RSD, wherein resolution of each respective event includes a performance of one or more tasks in the set of tasks that correspond to the first RSD or the second RSD;

identify a selected event icon in the event menu, the selected event icon included in the set of event icons;

generate an EGR in the maintenance arrangement of the second layer in response to identification of the selected event icon, wherein the EGR generated in the maintenance arrangement of the second layer corresponds to the selected event icon in the event menu;

identify a selected action icon in the action menu, the selected action icon included in the set of action icons;

generate an AGR in the maintenance arrangement of the second layer in response to identification of the selected action icon, wherein the AGR generated in the maintenance arrangement of the second layer corresponds to the selected action icon in the action menu;

graphically connect the EGR to the AGR in the maintenance arrangement of the diagram workspace with a linking graphical representation (LGR) in the second layer, the LGR to indicate that a resolution of an event associated with the EGR depends on performance of one or more tasks associated with the AGR;

simulate the event associated with the EGR in a reliability, availability, and maintainability (RAM) simulation, wherein simulated occurrence of the event associated with the EGR depends, at least in part, on the first reliability function that includes the first factor corresponding to stress applied to the first RSD; and simulate one or more of the tasks associated with the AGR in the RAM simulation in response to simulation of the event associated with the EGR, wherein simulated occurrence of one or more of the tasks associated with the AGR alters the second factor corresponding to stress applied to the second RSD in the second reliability function.

2. The system of claim 1, the event associated with the EGR comprising a failure of the first RSD or scheduled actions associated with the first RSD based on a calendar or a usage of the first RSD; and the one or more tasks associated with the AGR comprising one or more of a replacement of the first RSD with a new device, a repair of the first RSD, an inspection of the first RSD, an adjustment of the first RSD, or an evaluation of the first RSD.

3. The system of claim 1, wherein the processor is caused to perform operations comprising determine one or more of a spare part supply, a workforce availability, or a supply chain state that corresponds to performance of the one or more tasks associated with the AGR.

4. The system of claim 1, the diagram workspace comprising a second AGR connected to the EGR with a second LGR in parallel with the LGR, wherein connection of the EGR to the second AGR with the second LGR in parallel with connection of the EGR to the AGR with the LGR indicates the AGR and the second AGR are simulated in parallel.

5. The system of claim 1, wherein the processor is caused to perform operations comprising:

present a graphical control element within the diagram workspace; and graphically connect the EGR to the AGR with the LGR in the diagram workspace based on a manipulation of the graphical control element.

6. The system of claim 1, the event associated with the EGR comprising changing usage load of the first RSD according to a duty cycle of the first RSD and one or more of the tasks associated with the AGR comprising increasing stress applied to the second RSD, and wherein the processor is caused to perform operations comprising:

simulate changing usage load of the first RSD according to the duty cycle of the first RSD in the RAM simulation; and simulate increasing stress applied to the second RSD in the RAM simulation in response to simulation of changing the usage load of the first RSD, wherein simulation of increasing stress applied to the second RSD alters the second factor corresponding to stress applied to the second RSD in the second reliability function.

7. The system of claim 1, wherein the processor is caused to perform operations comprising generate a second AGR in the diagram workspace based on identification of the selected action icon, wherein the AGR and the second AGR are sub-actions of the selected action icon.

8. The system of claim 1, the LGR comprising an upstream connection and a downstream connection, the upstream connection connected to the EGR and the downstream connection connected to the AGR, wherein the upstream connection to the EGR indicates that simulation of the one or more tasks associated with the AGR occurs in response to simulation of the event associated with the EGR.

9. The system of claim 1, wherein simulation of the event associated with the EGR corresponds to a failure of the first RSD and simulation of the one or more tasks associated with the AGR corresponds to changing the second RSD from a standby state to an active state in the RAM simulation.

10. The system of claim 9, wherein changing the second RSD from a standby state to an active state alters the second factor corresponding to stress applied to the second RSD in the second reliability function to increase stress applied to the second RSD in the RAM simulation.

11. The system of claim 1, wherein the RBD in the first layer includes a start block and an end block with the SDGRs located between the start block and the end block, and the processor is caused to perform operations comprising determine the repairable system is reliable in the RAM simulation when a path exists from the start block to the end block.

12. The system of claim 1, the AGR in the second layer comprising a first AGR and a second AGR and the LGR in the second layer comprising a first LGR and a second LGR, the first LGR graphically connecting the EGR to the first AGR and the second LGR graphically connecting the EGR to the second AGR, wherein simulated occurrence of one or more tasks associated with the first AGR alters the first factor corresponding to stress applied to the first RSD in the first reliability function and simulated occurrence of one or more tasks associated with the second AGR alters the second factor corresponding to stress applied to the second RSD in the second reliability function.

13. The system of claim 1, wherein the EGR corresponds to failure of the first RSD and the first reliability function specifies how a simulated occurrence of failure of the first RSD is triggered.

14. A computer-implemented method, comprising:
presenting an interactive workspace, the interactive workspace to include an event menu, an action menu, and a diagram workspace, the diagram workspace comprising a first layer and a second layer, the first layer to include a reliability block diagram (RBD) with one or more system device graphical representations (SDGRs) that each represent a repairable system device (RSD) in a repairable system and the second layer to include a maintenance arrangement with one or more event graphical representations (EGRs) and one or more action graphical representations (AGRs), wherein each of the one or more EGRs of the maintenance arrangement in the second layer represent a respective event that affects at least one RSD represented by an SDGR of the RBD in the first layer and at least one of the one or more AGRs of the maintenance arrangement in the second layer represent an action that resolves, at least in part, the respective event that affects the at least one RSD represented by the SDGR of the RBD in the first layer,
the RBD in the first layer of the diagram workspace including a first SDGR and a second SDGR, the first SDGR to represent a first RSD in the repairable system and the second SDGR to represent a second RSD in the repairable system, wherein the first SDGR of the RBD in the first layer is associated with a first reliability function that includes a first factor corresponding to stress applied to the first RSD and the second SDGR of the RBD in the first layer is associated with a second reliability function that includes a second factor corresponding to stress applied to the second RSD,
the event menu including a set of event icons, each event icon in the set of event icons associated with at least one event to resolve, and
the action menu including a set of action icons, each action icon in the set of action icons associated with at least one task in a set of tasks that correspond to the first RSD or the second RSD, wherein a resolution of a respective event includes a performance of one or more tasks in the set of tasks that correspond to the first RSD or the second RSD;
identifying a selected event icon in the event menu, the selected event icon included in the set of event icons;
generating an EGR in the maintenance arrangement of the second layer in response to identification of the selected event icon, wherein the EGR generated in the maintenance arrangement of the second layer corresponds to the selected event icon in the event menu;
identifying a selected action icon in the action menu, the selected action icon included in the set of action icons;
generating an AGR in the maintenance arrangement of the second layer in response to identification of the selected action icon, wherein the AGR generated in the maintenance arrangement of the second layer corresponds to the selected action icon in the action menu;
graphically connecting the EGR to the AGR in the maintenance arrangement of the diagram workspace with a linking graphical representation (LGR) in the second layer, the LGR to indicate that a resolution of an event associated with the EGR depends on performance of one or more tasks associated with the AGR;
simulating the event associated with the EGR in a reliability, availability, and maintainability (RAM) simulation, wherein simulated occurrence of the event associated with the EGR depends, at least in part, on the first reliability function that includes the first factor corresponding to stress applied to the first RSD; and
simulating one or more of the tasks associated with the AGR in the RAM simulation in response to simulation of the event associated with the EGR, wherein simulated occurrence of one or more of the tasks associated with the AGR alters the second factor corresponding to stress applied to the second RSD in the second reliability function.

15. The computer-implemented method of claim 14, the event associated with the EGR comprising a failure of the first RSD or scheduled actions associated with the first RSD based on a calendar or a usage of the first RSD; and
the one or more tasks associated with the AGR comprising one or more of a replacement of the first RSD with a new device, a repair of the first RSD, an inspection of the first RSD, an adjustment of the first RSD, or an evaluation of the first RSD.

16. The computer-implemented method of claim 14, comprising determining one or more of a spare part supply, a workforce availability, or a supply chain state that corresponds to performance of the one or more tasks associated with the AGR.

17. The computer-implemented method of claim 14, the diagram workspace comprising a second AGR connected to the EGR with a second LGR in parallel with the LGR, wherein connection of the EGR to the second AGR with the second LGR in parallel with connection of the EGR to the AGR with the LGR indicates the AGR and the second AGR are simulated in parallel.

18. The computer-implemented method of claim 14, comprising:
presenting a graphical control element within the diagram workspace; and
graphically connecting the EGR to the AGR with the LGR in the diagram workspace based on a manipulation of the graphical control element.

19. The computer-implemented method of claim 14, the event associated with the EGR comprising changing usage load of the first RSD according to a duty cycle of the first RSD and one or more of the tasks associated with the AGR comprising increasing stress applied to the second RSD, and wherein the processor is caused to perform operations comprising:

simulating changing usage load of the first RSD according to the duty cycle of the first RSD in the RAM simulation; and simulating increasing stress applied to the second RSD in the RAM simulation in response to simulation of changing the usage load of the first RSD, wherein simulation of increasing stress applied to the second RSD alters the second factor corresponding to stress applied to the second RSD in the second reliability function.

20. The computer-implemented method of claim 14, comprising generating a second AGR in the diagram workspace based on identification of the selected action icon, wherein the AGR and the second AGR are sub-actions of the selected action icon.

21. The computer-implemented method of claim 14, the LGR comprising an upstream connection and a downstream connection, the upstream connection connected to the EGR and the downstream connection connected to the AGR, wherein the upstream connection to the EGR indicates that simulation of the one or more tasks associated with the AGR occurs in response to simulation of the event associated with the EGR.

22. The computer-implemented method of claim 14, wherein simulation of the event associated with the EGR corresponds to a failure of the first RSD and simulation of the one or more tasks associated with the AGR corresponds to changing the second RSD from a standby state to an active state in the RAM simulation.

23. The computer-implemented method of claim 22, wherein changing the second RSD from a standby state to an active state alters the second factor corresponding to stress applied to the second RSD in the second reliability function to increase stress applied to the second RSD in the RAM simulation.

24. The computer-implemented method of claim 14, wherein the RBD in the first layer includes a start block and an end block with the SDGRs located between the start block and the end block, and comprising determining the repairable system is reliable in the RAM simulation when a path exists from the start block to the end block.

25. The computer-implemented method of claim 14, the AGR in the second layer comprising a first AGR and a second AGR and the LGR in the second layer comprising a first LGR and a second LGR, the first LGR graphically connecting the EGR to the first AGR and the second LGR graphically connecting the EGR to the second AGR, wherein simulated occurrence of one or more tasks associated with the first AGR alters the first factor corresponding to stress applied to the first RSD in the first reliability function and simulated occurrence of one or more tasks associated with the second AGR alters the second factor corresponding to stress applied to the second RSD in the second reliability function.

26. The computer-implemented method of claim 14, wherein the EGR corresponds to failure of the first RSD and the first reliability function specifies how a simulated occurrence of failure of the first RSD is triggered.

27. A computer-program product tangibly embodied in a non-transitory machine-readable storage medium, the computer-program product including instructions operable to cause a processor to perform operations comprising:

present an interactive workspace, the interactive workspace to include an event menu, an action menu, and a diagram workspace, the diagram workspace comprising a first layer and a second layer, the first layer to include a reliability block diagram (RBD) with one or more system device graphical representations (SDGRs) that each represent a repairable system device (RSD) in a repairable system and the second layer to include a maintenance arrangement with one or more event graphical representations (EGRs) and one or more action graphical representations (AGRs), wherein each of the one or more EGRs of the maintenance arrangement in the second layer represent a respective event that affects at least one RSD represented by an SDGR of the RBD in the first layer and at least one of the one or more AGRs of the maintenance arrangement in the second layer represent an action that resolves, at least in part, the respective event that affects the at least one RSD represented by the SDGR of the RBD in the first layer, the RBD in the first layer of the diagram workspace to include a first SDGR and a second SDGR, the first SDGR to represent a first RSD in the repairable system and the second SDGR to represent a second RSD in the repairable system, wherein the first SDGR of the RBD in the first layer is associated with a first reliability function that includes a first factor corresponding to stress applied to the first RSD and the second SDGR of the RBD in the first layer is associated with a second reliability function that includes a second factor corresponding to stress applied to the second RSD, the event menu to include a set of event icons, each event icon in the set of event icons associated with at least one event to resolve, and the action menu to include a set of action icons, each action icon in the set of action icons associated with at least one task in a set of tasks that correspond to the first RSD or the second RSD, wherein resolution of each respective event includes a performance of one or more tasks in the set of tasks that correspond to the first RSD or the second RSD;

identify a selected event icon in the event menu, the selected event icon included in the set of event icons;

generate an EGR in the maintenance arrangement of the second layer in response to identification of the selected event icon, wherein the EGR generated in the maintenance arrangement of the second layer corresponds to the selected event icon in the event menu;

identify a selected action icon in the action menu, the selected action icon included in the set of action icons;

generate an AGR in the maintenance arrangement of the second layer in response to identification of the selected action icon, wherein the AGR generated in the maintenance arrangement of the second layer corresponds to the selected action icon in the action menu;

graphically connect the EGR to the AGR in the maintenance arrangement of the diagram workspace with a linking graphical representation (LGR) in the second layer, the LGR to indicate that a resolution of an event associated with the EGR depends on performance of one or more tasks associated with the AGR;

simulate the event associated with the EGR in a reliability, availability, and maintainability (RAM) simulation, wherein simulated occurrence of the event associated with the EGR depends, at least in part, on the first reliability function that includes the first factor corresponding to stress applied to the first RSD; and simulate one or more of the tasks associated with the AGR in the RAM simulation in response to simulation of the event associated with the EGR, wherein simulated occurrence of one or more of the tasks associated with the AGR alters the second factor corresponding to stress applied to the second RSD in the second reliability function.

28. The computer-program product of claim 27, the event associated with the EGR comprising a failure of the first RSD or scheduled actions associated with the first RSD based on a calendar or a usage of the first RSD; and the one or more tasks associated with the AGR comprising one or more of a replacement of the first RSD with a new device, a repair of the first RSD, an inspection of the first RSD, an adjustment of the first RSD, or an evaluation of the first RSD.

29. The computer-program product of claim 27, including instructions operable to cause the processor to perform operations comprising determine one or more of a spare part supply, a workforce availability, or a supply chain state that corresponds to performance of the one or more tasks associated with the AGR.

30. The computer-program product of claim 27, the diagram workspace comprising a second AGR connected to the EGR with a second LGR in parallel with the LGR, wherein connection of the EGR to the second AGR with the second LGR in parallel with connection of the EGR to the AGR with the LGR indicates the AGR and the second AGR are simulated in parallel.

31. The computer-program product of claim 27, including instructions operable to cause the processor to perform operations comprising:

present a graphical control element within the diagram workspace; and graphically connect the EGR to the AGR with the LGR in the diagram workspace based on a manipulation of the graphical control element.

32. The computer-program product of claim 27, the event associated with the EGR comprising changing usage load of the first RSD according to a duty cycle of the first RSD and one or more of the tasks associated with the AGR comprising increasing stress applied to the second RSD, and wherein the processor is caused to perform operations comprising:

simulate changing usage load of the first RSD according to the duty cycle of the first RSD in the RAM simulation; and simulate increasing stress applied to the second RSD in the RAM simulation in response to simulation of changing the usage load of the first RSD, wherein simulation of increasing stress applied to the second RSD alters the second factor corresponding to stress applied to the second RSD in the second reliability function.

33. The computer-program product of claim 27, including instructions operable to cause the processor to perform operations comprising generate a second AGR in the diagram workspace based on identification of the selected action icon, wherein the AGR and the second AGR are sub-actions of the selected action icon.

34. The computer-program product of claim 27, the LGR comprising an upstream connection and a downstream connection, the upstream connection connected to the EGR and the downstream connection connected to the AGR, wherein the upstream connection to the EGR indicates that simulation of the one or more tasks associated with the AGR occurs in response to simulation of the event associated with the EGR.

35. The computer-program product of claim 27, wherein simulation of the event associated with the EGR corresponds to a failure of the first RSD and simulation of the one or more tasks associated with the AGR corresponds to changing the second RSD from a standby state to an active state in the RAM simulation.

36. The computer-program product of claim 35, wherein changing the second RSD from a standby state to an active state alters the second factor corresponding to stress applied to the second RSD in the second reliability function to increase stress applied to the second RSD in the RAM simulation.

37. The computer-program product of claim 27, wherein the RBD in the first layer includes a start block and an end block with the SDGRs located between the start block and the end block, and including instructions operable to cause the processor to perform operations comprising determine the repairable system is reliable in the RAM simulation when a path exists from the start block to the end block.

38. The computer-program product of claim 27, the AGR in the second layer comprising a first AGR and a second AGR and the LGR in the second layer comprising a first LGR and a second LGR, the first LGR graphically connecting the EGR to the first AGR and the second LGR graphically connecting the EGR to the second AGR, wherein simulated occurrence of one or more tasks associated with the first AGR alters the first factor corresponding to stress applied to the first RSD in the first reliability function and simulated occurrence of one or more tasks associated with the second AGR alters the second factor corresponding to stress applied to the second RSD in the second reliability function.

39. The computer-program product of claim 27, wherein the EGR corresponds to failure of the first RSD and the first reliability function specifies how a simulated occurrence of failure of the first RSD is triggered.

* * * * *